US012636631B2

(12) United States Patent
Wang et al.

(10) Patent No.: US 12,636,631 B2
(45) Date of Patent: May 26, 2026

(54) ACTIVATED CARBON AND METHOD OF FABRICATION THEREOF

(71) Applicants: NATIONAL UNIVERSITY OF SINGAPORE, Singapore (SG); Sembcorp Industries Ltd., Singapore (SG)

(72) Inventors: Chi-Hwa Wang, Singapore (SG); Babu Cadiam Mohan, Singapore (SG); Zhiyi Yao, Singapore (SG); Anbu Mozhi Thamizhchelvan, Singapore (SG)

(73) Assignees: NATIONAL UNIVERSITY OF SINGAPORE, Singapore (SG); Sembcorp Industries Ltd., Singapore (SG)

( * ) Notice: Subject to any disclaimer, the term of this patent is extended or adjusted under 35 U.S.C. 154(b) by 874 days.

(21) Appl. No.: 17/916,443

(22) PCT Filed: Mar. 31, 2021

(86) PCT No.: PCT/SG2021/050180
§ 371 (c)(1),
(2) Date: Sep. 30, 2022

(87) PCT Pub. No.: WO2021/201778
PCT Pub. Date: Oct. 7, 2021

(65) Prior Publication Data
US 2023/0149893 A1 May 18, 2023

(30) Foreign Application Priority Data
Mar. 31, 2020 (SG) ........................... 10202003008X

(51) Int. Cl.

| | |
|---|---|
| ***B01J 20/20*** | (2006.01) |
| ***B01J 20/10*** | (2006.01) |
| ***B01J 20/22*** | (2006.01) |
| ***B01J 20/28*** | (2006.01) |
| ***B01J 20/30*** | (2006.01) |
| ***B01J 20/32*** | (2006.01) |
| ***C01B 32/318*** | (2017.01) |
| ***C01B 32/348*** | (2017.01) |
| ***C01B 32/372*** | (2017.01) |

(52) U.S. Cl.
CPC ............. *B01J 20/20* (2013.01); *B01J 20/103* (2013.01); *B01J 20/22* (2013.01); *B01J 20/28007* (2013.01); *B01J 20/28016* (2013.01); *B01J 20/28064* (2013.01); *B01J 20/2808* (2013.01); *B01J 20/3078* (2013.01); *B01J 20/3204* (2013.01); *B01J 20/3217* (2013.01); *B01J 20/3234* (2013.01); *B01J 20/3244* (2013.01); *B01J 20/3293* (2013.01); *C01B 32/318* (2017.08); *C01B 32/348* (2017.08); *C01B 32/372* (2017.08); *C01P 2002/72* (2013.01); *C01P 2002/82* (2013.01); *C01P 2002/88* (2013.01); *C01P 2004/03* (2013.01); *C01P 2004/04* (2013.01); *C01P 2004/62* (2013.01); *C01P 2004/64* (2013.01); *C01P 2004/80* (2013.01); *C01P 2006/12* (2013.01); *C01P 2006/16* (2013.01)

(58) Field of Classification Search
CPC . B01J 20/20; B01J 20/103; B01J 20/22; B01J 20/28007; B01J 20/28016; B01J 20/28064; B01J 20/2808; B01J 20/3078; B01J 20/3204; B01J 20/3217; B01J 20/3234; B01J 20/3244; B01J 20/3293; C01B 32/318; C01B 32/348; C01B 32/372
See application file for complete search history.

(56) References Cited

U.S. PATENT DOCUMENTS 6,337,302 B1 1/2002 Teng et al.
2019/0351392 A1* 11/2019 Tran-Thi ............. B01J 20/3293

FOREIGN PATENT DOCUMENTS

CN 1412110 A 4/2003
CN 101648707 A * 2/2010 ............. C01B 31/12
CN 108117074 A * 6/2018 ............... C01D 7/00

OTHER PUBLICATIONS

Nazem et al., "Preparation and optimization of activated nano-carbon production using physical activation by water stream from agricultural wastes", Royal Society of Chemistry paper, 10 1463-1475, 2020.
Kugatov et al., "Production of Molded Activated Carbon from Carbon Black and Petroleum Pitch by Alkaline Activation", Russian Journal of Applied Chemistry, vol. 89, No. 6, pp. 886-890, 2016.

* cited by examiner

*Primary Examiner* — Yong L Chu
(74) *Attorney, Agent, or Firm* — MARSHALL, GERSTEIN & BORUN LLP

(57) ABSTRACT

The present invention relates, in general terms, to methods of forming activated carbon. The method of forming activated carbon comprises mixing carbon black with an activation catalyst and heating the carbon black in order to form the activated carbon. The present invention also relates to applications of activated carbon as disclosed herein. In a preferred embodiment, the activation catalyst is selected from ammonium persulfate, sodium persulfate, potassium persulfate or a combination thereof.

17 Claims, 9 Drawing Sheets

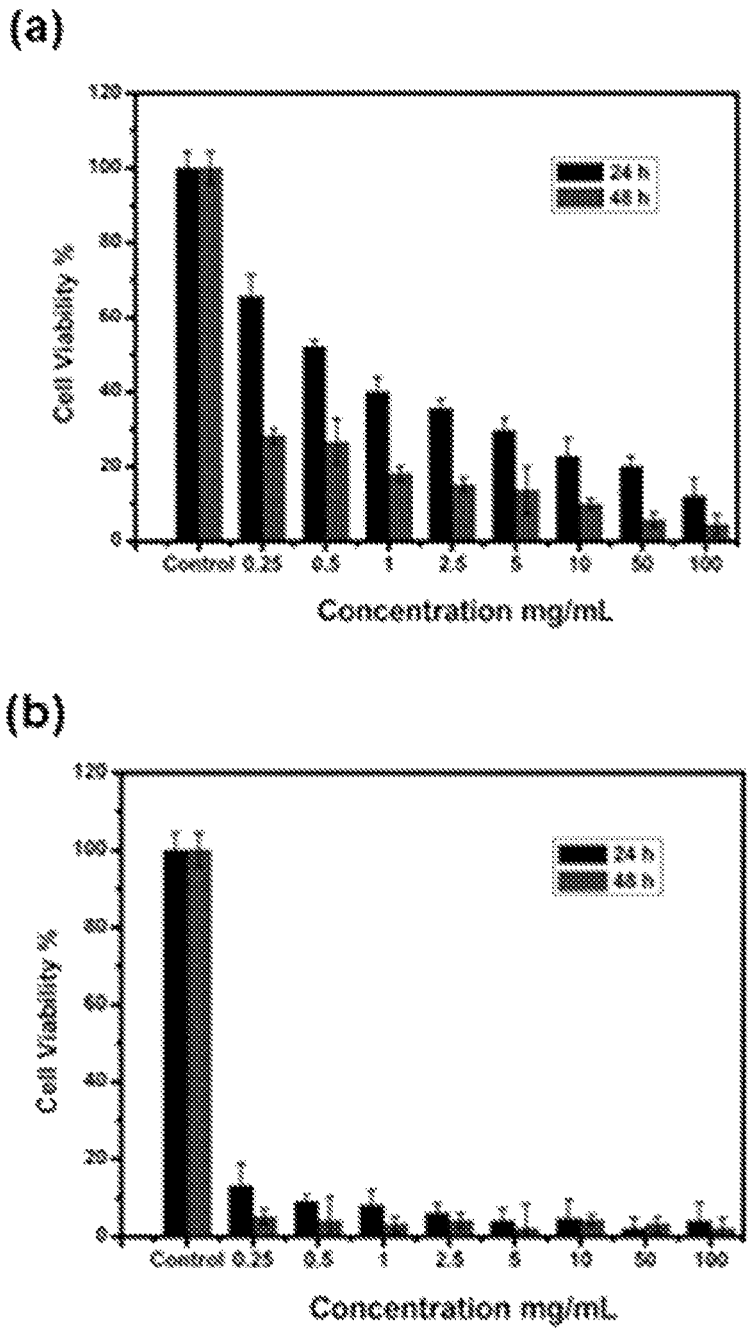
Figure 10a-b (c)
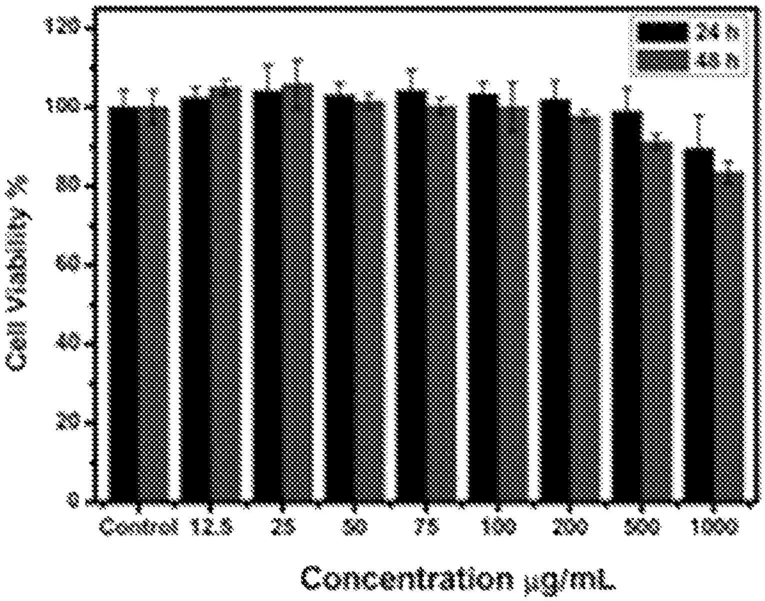
(d)
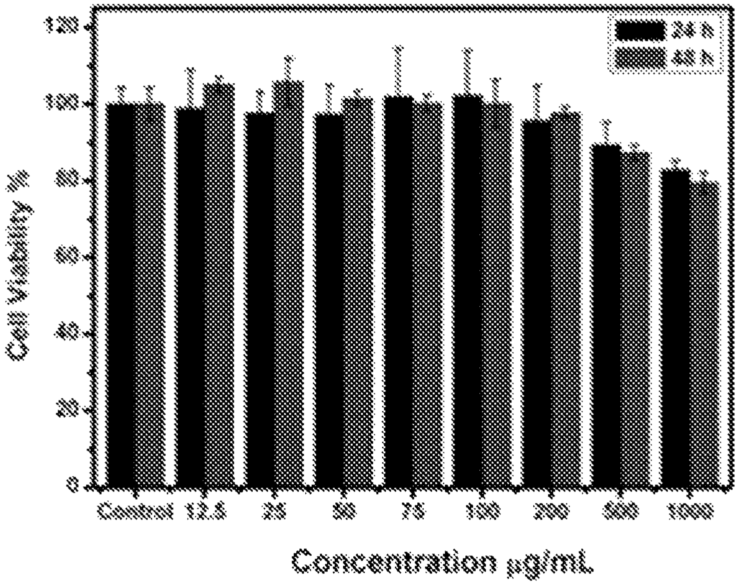
Figure 10c-d (e)
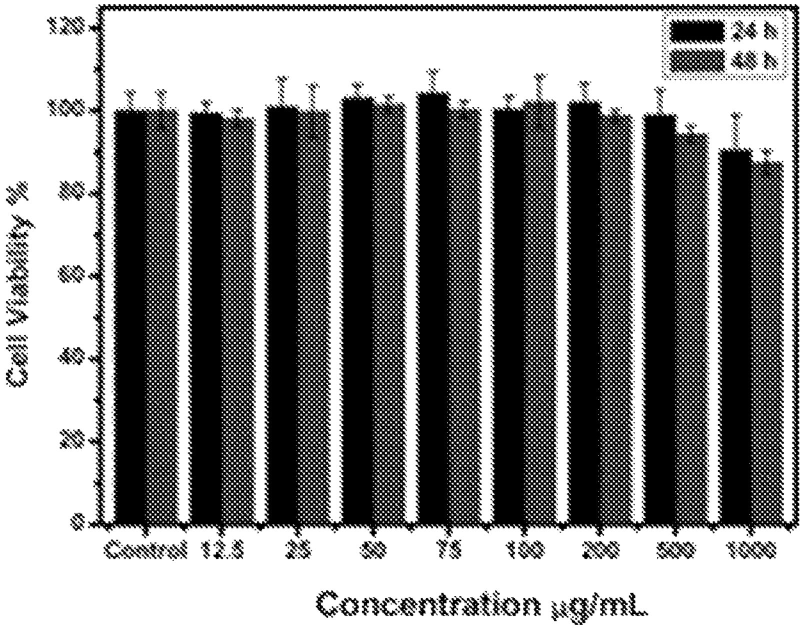
(f)
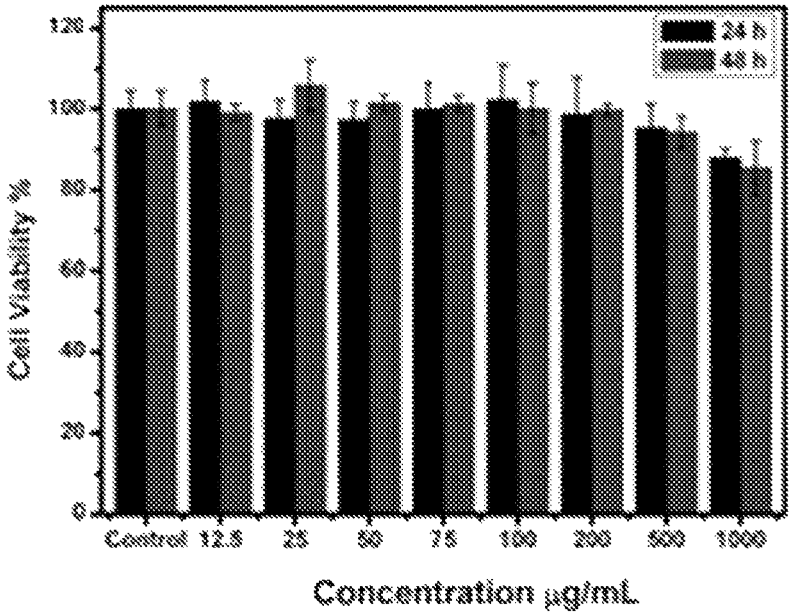
Figure 10e-f

ACTIVATED CARBON AND METHOD OF FABRICATION THEREOF

This application is a national phase filing of International Patent Application No. PCT/SG2021/050180, filed Mar. 31, 2021, which claims priority benefit of Singapore patent application Ser. No. 10/202,003008X, filed Mar. 31, 2020, both which are incorporated by reference herein in their entirety.

TECHNICAL FIELD

The present invention relates, in general terms, to methods of forming activated carbon. The present invention also relates to applications of activated carbon as disclosed herein.

BACKGROUND

In recent decades, incineration of carbon waste creates a major air and soil pollution to the environment. This practice raises issues such as potential toxicity to the environment and the loss of valuable materials. This carbon waste contains a lot of valuable heavy metals and carbon black, which can be used for various industrial applications. Recycling of the low-grade carbon from the carbon wastes and further converting them to value-added materials are necessary in both economic and environmental point of view. Instead of incineration, conversion of carbon black waste to value added product is an emerging field in the global society. Carbon black (CB) is a carbon-based material having nanometer particle size. Their remarkable properties include large surface area, excellent electron transport property and chemical property. Due to these remarkable properties, these carbon nanomaterials have been exploited for various applications such as water treatment, pigment, optoelectronics, solar-energy harvesting, conductive fillers and so on. However, structural properties of CBs, mainly their particle size and porosity, depend strongly on the feedstock (oil, coal or natural gas) and manufacturing process. The carbon black leached from carbon black waste has been considered as low-grade material because of poor physical and chemical properties. As a result, the consistency of resultant properties of mass produced CB impregnated materials is low.

Many physical and chemical treatment methods have been developed to convert the low-grade carbon to high-value end products. Existing physical activation needs extremely high temperature (>800° C.) in the presence of steam, air, $CO_2$, $N_2$ and inert gases. Chemical activation was carried out involves using highly hazardous chemicals like nitric acid, phosphoric acid, sulfuric acid and potassium hydroxide to induce the activation. High energy consumption for physical activation and hazardous chemicals usage during chemical activation are major drawbacks for these technologies.

The activated carbon market is a rapidly growing market with demand exceeding supply. Additionally, there are increasing restrictive regulations placed on production due to the above mentioned problems. The global market potential is expected to be about $26 B in 2025, of which the Asian market is expected to be about $5 B.

It would be desirable to overcome or ameliorate at least one of the above-described problems, or at least to provide a useful alternative.

SUMMARY

The present invention relates to methods for producing activated carbon. In particularly, it relates to the conversion of low-grade carbon black (e.g. carbon black extracted from the oil refinery waste) to activated carbon by combinatory chemical and physical activation means. This activation strategy provides for an activated carbon with high surface area and adsorption capacity, and advantageously will reduce processing cost and raw material cost for activated carbon production. In contrast, the current practise to make activated carbon is from charcoal, which increases the cost price of activated carbon as charcoal is relatively more expensive.

The present invention relates to a method of forming activated carbon, comprising:

a) mixing carbon black with an activation catalyst in a polar solvent to form a mixture; and b) heating the mixture at about 350° C. to about 500° C. in order to form the activated carbon;

wherein the weight ratio of carbon black to activation catalyst is of about 1:0.1 to about 1:0.5; and wherein the activation catalyst is selected from ammonium persulfate, sodium persulfate, potassium persulfate or a combination thereof.

Compared to existing technology which uses steam activation to produce activated carbon at temperature above 800° C., the present invention uses low-cost catalyst and moderate temperature (<500° C.) to convert low-grade carbon to activated carbon. The present invention also does not require steam or a pressurised system to work. Further advantageously, the method has lower energy requirement and higher activated carbon yields as compared with existing activation process. It can also be applied for other carbon wastes.

In some embodiments, the mixture is heated at about 400° C. for at least 3 h.

In some embodiments, the solvent is selected from water, ethanol, ethylene glycol or a combination thereof.

In some embodiments, the solvent is a mixture of water and ethanol at a weight ratio of 85:15, a mixture of water and ethylene glycol at a weight ratio of 85:15, or a mixture of ethanol and ethylene glycol at a weight ratio of 85:15.

Advantageously, the solvent enables a substantial mixing (or complete mixing) of the carbon black and the activation catalyst such that the activation catalyst can at least be adsorbed on the surface of carbon black.

In some embodiments, the weight ratio of carbon black to solvent is about 1:5 to about 1:100.

In some embodiments, the mixture is mixed for at least 1 h.

In some embodiments, the method further comprises adding a co-catalyst to the mixture in step (a).

In some embodiments, the co-catalyst is mixed with the mixture for at least 3 h.

In some embodiments, the co-catalyst is ammonia or ammonium hydroxide.

In some embodiments, the weight ratio of the activation catalyst to the co-catalyst is about 1:0.1.

In some embodiments, the pH of the mixture is maintained at about 7 to about 9.

In some embodiments, the mixture is heated at a rate of about 1° C./min to about 5° C./min.

In some embodiments, the method further comprises a step after step (a) of drying the mixture.

The present invention also relates to a method of forming silane functionalised activated carbon, comprising:

a) mixing carbon black with a silane agent and an activation catalyst in a polar solvent to form a mixture; and b) heating the mixture at about 350° C. to about 500° C. in order to form the silane functionalised activated carbon;

wherein the weight ratio of carbon black to activation catalyst is of about 1:0.1 to about 1:0.5; and wherein the activation catalyst is selected from acetic acid and/or ammonia.

Advantageously, the silane agent acts as a bridging moiety for the formation of mesoporous activated carbon. Towards this end, the silane agent allows for inter-carbon linkages between carbon particles to be formed, thus forming pores between the carbon particles.

In some embodiments, the mixture is stirred for at least 3 h at room temperature.

In some embodiments, the mixture is heated at about 350° C. for at least 6 h.

In some embodiments, the weight ratio of carbon black to silane agent is of about 1:0.18 to about 1:0.25.

In some embodiments, the weight ratio of silane agent to catalyst is of about 1:0.5 to about 1:1.7.

In some embodiments, the silane agent is selected from bistriethoxysilane (1,2-bis(triethoxysilyl)ethane)), 1,2-Bis (trichlorosilyl)ethane, 1,2-Bis(trimethoxysilyl)ethane or a combination thereof.

The present invention also relates to an activated carbon formed from a method as disclosed herein.

In some embodiments, the activated carbon has a particle size of about 40 nm to about 80 nm.

In some embodiments, the activated carbon has a BET surface area of more than 600 $m^2/g$.

In some embodiments, the activated carbon has a pore diameter of at least 1.5 nm.

In some embodiments, the activated carbon has a dye adsorption of at least 170 mg/g.

The present invention also relates to a silane functionalised activated carbon formed from a method as disclosed herein.

In some embodiments, the silane functionalised activated carbon has a particle size is about 140 nm to about 500 nm.

In some embodiments, the silane functionalised activated carbon comprises at least 4 carbon particles.

In some embodiments, the silane functionalised activated carbon has a silica shell with a thickness of about 10 nm on at least a surface of the activated carbon.

In some embodiments, the silane functionalised activated carbon has a BET surface area of more than 600 $m^2/g$.

In some embodiments, the silane functionalised activated carbon has a pore diameter of at least 9 nm.

BRIEF DESCRIPTION OF THE DRAWINGS

Embodiments of the present invention will now be described, by way of non-limiting example, with reference to the drawings in which:

FIG. 10 illustrates viability of human cell lines against Carbon X, AC-AP and AC-Si.

DETAILED DESCRIPTION

Figure 1:
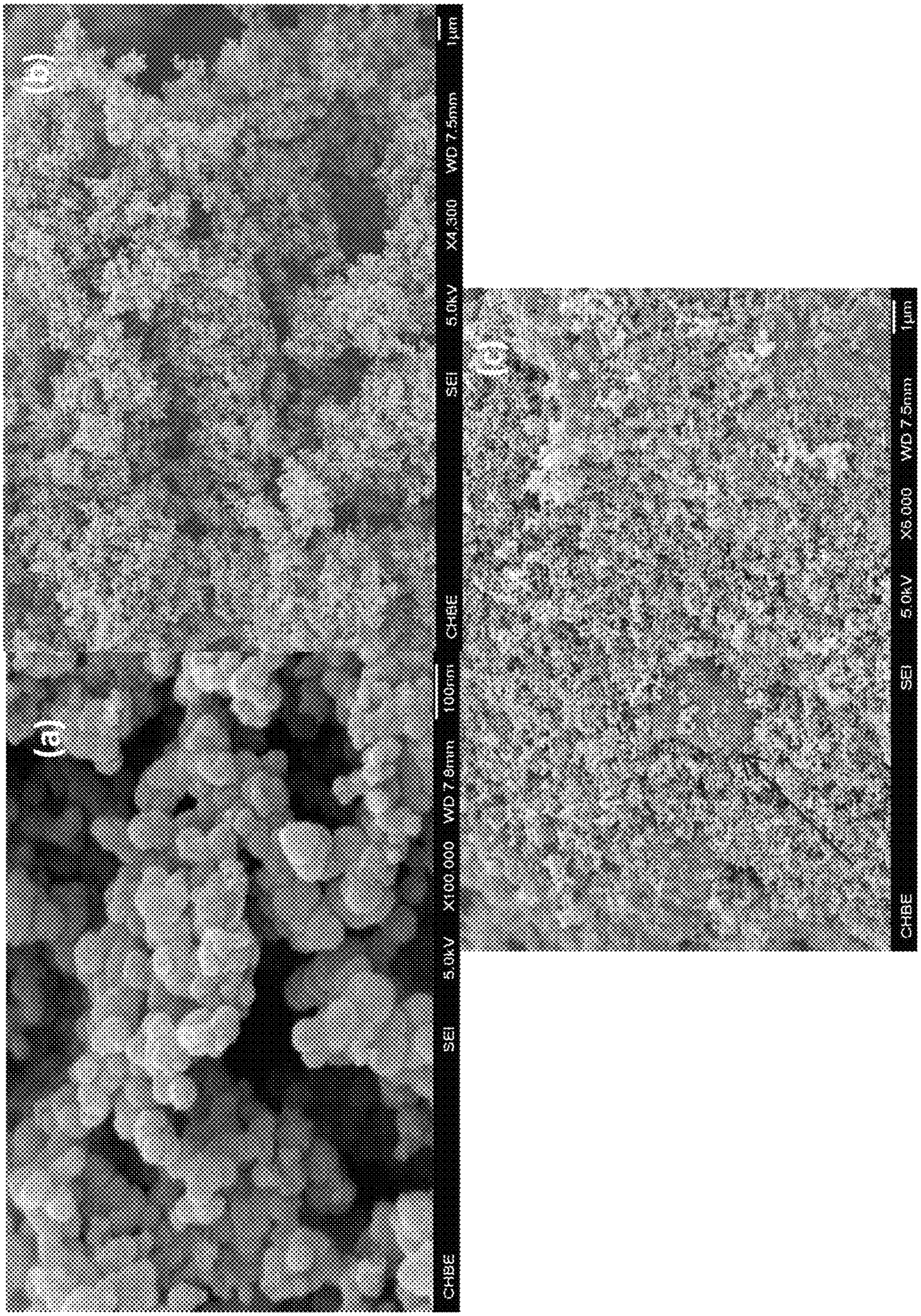
FIG. 1 illustrates SEM images of (a) Carbon X, (b) AC-AP and (c) AC-Si.

The present invention is predicated on the understanding that current methods for converting the low-grade carbon to high-value end products are energy intensive and requires harsh chemicals. In this regard, downstream processing is extremely challenging and not suitable for large scale manufacturing. To this end, the inventors have developed methods for converting carbon black waste produced from, for example, oil refinery waste to activated carbon.

In the present invention, a method was developed to obtain highly efficient activated carbon by combining both physical and chemical activation method. In this regard, a synergistic effect can be obtained in that a less (or non) hazardous chemical can be used. Further, a lower activation temperature can be used, which when in combination with the chemicals, provides an activated carbon which has a high surface area, pore diameter and adsorption profile. Advantageously, such a method can be cost-effective as 50% less energy can be used and a 40% higher yield can be obtained. Further advantageously, as the method uses waste carbon, the production cost can be reduced. The method is also more environmentally friendly compared to current industrial practices.

Accordingly, the present invention relates to a method of forming activated carbon, comprising:

a) mixing carbon black with an activation catalyst in a polar solvent to form a mixture; and b) heating the mixture at about 350° C. to about 500° C. in order to form the activated carbon;

wherein the weight ratio of carbon black to activation catalyst is of about 1:0.1 to about 1:0.5; and wherein the activation catalyst is selected from ammonium persulfate, sodium persulfate, potassium persulfate, acetic acid, ammonia or a combination thereof.

The method of forming activated carbon converts carbon black into activated carbon. 'Activated carbon' is also called activated charcoal, is deemed "activated" when it is characterised with an increase in surface area. For example, a gram of activated carbon can have a surface area of about 500 $m^2$ to about 3,000 $m^2$, as determined by gas adsorption. In this regard, the increase in surface area from charcoal to activated carbon is created through a process that makes lots of holes and crevices in the charcoal. These pores are available for adsorption, for interaction with halogens, for acid-base reactions, or for oxidation-reduction reactions. Conventionally, activated carbon is produced through physical activation, in which charcoal is either carbonized (pyrolyzed at temperatures in the range 600-900° C., usually in an inert atmosphere with gases like argon or nitrogen) or oxidised under high temperature (exposed to oxidizing atmospheres (oxygen or steam) at temperatures of 600-1200° C.). Alternatively, chemical activated traditionally involves The chemical is typically a strong acid or strong base (phosphoric acid 25%, potassium hydroxide 5%, sodium hydroxide 5%), followed by heating at temperatures of about 250-600° C. It is believed that the temperature activates the carbon at this stage by forcing the material to open up and have more microscopic pores. Activated is sometimes substituted with active.

In contrast, the present invention relies on an activation catalyst or oxidising agent such as ammonium persulfate, sodium persulfate, potassium persulfate, acetic acid, ammonia or a combination thereof for activation of carbon. Such compounds are less harsh as compared to strong acids and bases. Further, compounds such as ammonium persulfate, sodium persulfate, and potassium persulfate are solids, and are accordingly easier to handle on a large manufacturing scale.

The activated carbon of the present invention is formed as a nanoporous materials. "Nanoporous" refers to an organic or inorganic framework supporting a porous structure. The size of the pores is generally 100 nm or smaller. The pores can be filled with a fluid (liquid or gas). Nanoporous materials can be subdivided into 3 categories, as set out by International Union of Pure and Applied Chemistry (IUPAC): microporous materials which have pores of about 0.2 to about 2 nm; mesoporous materials which have pores of about 2 to about 50 nm; and macroporous materials which have pores of more than about 50 nm. Surface area measurements can be correlated to the presence of micropores, mesopores and macropores while iodine number can be correlated to the presence of micropores.

In some embodiments, the carbon black is carbon X (product of Sembcorp Industries Ltd). Carbon X is carbon black obtained from carbon waste using acid or alkaline leaching process.

The carbon black is mixed with an activation catalyst in a polar solvent to form a mixture. As used herein, "activation catalyst" refers to a substance that is used at least in part to activate carbon black, by for example initiating a chemical reaction on the surface of carbon black. The rate of reaction can be increased as a result. The activation catalyst be alternatively also be referred to as an oxidising agent or reagent. The activation catalyst can be added in a small amount relative to the carbon black. In some embodiments, the activation catalyst is a homogenous catalyst, which can be decomposed at certain temperatures. The activation catalyst is selected from ammonium persulfate, sodium persulfate, potassium persulfate, acetic acid or ammonia. In some embodiments, the activation catalyst is ammonium persulfate. In particular, the inventors have found that ammonium persulfate, sodium persulfate and potassium persulfate, for example, is advantageous as it is not as harsh as other chemicals used in the chemical oxidation process. Further, persulfate salts can act as an etchant to remove impurities on the surfaces of carbon black, thus exposing the surfaces of carbon black for activation. At the end of the reaction, persulfate salts can be converted to sulphate and easily removed.

In some embodiments, the weight ratio of carbon black to activation catalyst is of about 1:0.1 to about 1:0.5. In other embodiments, the weight ratio is about 1:0.1 to about 1:0.4, about 1:0.1 to about 1:0.3, or about 1:0.1 to about 1:0.2. In other embodiments, the weight ratio is about 1:0.1, about 1:0.2, about 1:0.3, about 1:0.4, or about 1:0.5.

When the weight ratio is less than 1:0.1, the activation catalyst is insufficiently activated to make the porosity in the carbon which leads to low surface area. When the weight ratio is above 1:0.5, the excess activation catalyst will destroy the pores by uncontrollable activation of persulfate. It was found that a weight ratio within the described range is advantageous to get the uniform porous nature to reach the surface area around 800 $m^2/g$.

'Polar solvent' as used herein, refers to a solvent having molecules that have a slight electrical charge due to its shape. For example, water is a molecule with one oxygen and two hydrogen atoms. The two hydrogen atoms are not on opposite sides of the oxygen, but rather at an angle. Also within its scope are polar protic solvents and polar aprotic solvents. A protic solvent is a solvent that has a hydrogen atom bound to an oxygen (as in a hydroxyl group), a nitrogen (as in an amine group), or fluoride (as in hydrogen fluoride). In general terms, any solvent that contains a labile $H^+$ is called a protic solvent. The molecules of such solvents readily donate protons (H+) to solutes, often via hydrogen bonding. Water is the most common protic solvent. Conversely, aprotic solvents cannot donate hydrogen. Solvent systems refer to combinations of solvents which resulting in a final single phase and are including within this definition. Both 'solvents' and 'solvent systems' can include, and is not limited to, pentane, cyclopentane, hexane, cyclohexane, benzene, toluene, dioxane, chloroform, diethylether, dichloromethane, tetrahydrofuran, ethyl acetate, acetone, dimethylformamide, acetonitrile, dimethyl sulfoxide, nitromethane, propylene carbonate, formic acid, butanol, isopropanol, propanol, ethanol, methanol, acetic acid, ethylene glycol, diethylene glycol or water. Water based solvent or solvent systems can also include dissolved ions, salts and molecules such as amino acids, proteins, sugars and phospholipids. Such salts may be, but not limited to, sodium chloride, potassium chloride, ammonium acetate, magnesium acetate, magnesium chloride, magnesium sulfate, potassium acetate, potassium chloride, sodium acetate, sodium citrate, zinc chloride, HEPES sodium, calcium chloride, ferric nitrate, sodium bicarbonate, potassium phosphate and sodium phosphate.

In some embodiments, the solvent is selected from water, ethanol, ethylene glycol or a combination thereof. In other embodiments, the solvent is water. The use of a green solvent such as water allows for the ease of handling the production medium as well as the disposal and clean-up of the waste.

In some embodiments, the weight ratio of carbon black to solvent is about 1:5 to about 1:100. In other embodiments, the weight ratio is about 1:5 to about 1:90, about 1:5 to about 1:80, about 1:5 to about 1:70, about 1:5 to about 1:60, about 1:5 to about 1:50, about 1:5 to about 1:40, about 1:5 to about 1:30, about 1:5 to about 1:20, or about 1:5 to about 1:10. In other embodiments, the weight ratio is about 1:5, 1:10, 1:20; 1:30, 1:40; 1:50, 1:60; 1:70, 1:80; 1:90, or 1:100.

In some embodiments, the mixture is mixed for at least 1 h. In other embodiments, the mixture is mixed for at least 2 h, 3 h, 4 h or 5 h. The mixing allows for a homogenous dispersion.

In some embodiments, the method of forming activated carbon comprises:

a) mixing carbon black with an activation catalyst in a polar solvent to form a mixture; and b) heating the mixture at about 350° C. to about 500° C. in order to form the activated carbon;

wherein the weight ratio of carbon black to activation catalyst is of about 1:0.1 to about 1:0.5; and wherein the activation catalyst is selected from ammonium persulfate, sodium persulfate, potassium persulfate or a combination thereof.

In some embodiments, the method further comprises adding a co-catalyst to the mixture. A co-catalyst refers to a substance or agent that brings about catalysis in conjunction with one or more others catalyst. A co-catalyst can provide active sites for surface catalytic reactions; the chemical properties of co-catalyst (structure, species, location, etc.) affect the behaviour of surface reactions. In this regard, it can be heterogeneous co-catalyst. Alternatively, the co-catalyst can be a homogenous chemical species that improve catalytic activity.

In some embodiments, the co-catalyst is ammonia or ammonium hydroxide.

In some embodiments, the co-catalyst is mixed with the mixture for at least 1 h. In other embodiments, the co-catalyst is mixed with the mixture for at least 1.5 h, 2 h, 2.5 h, 3 h, 3.5 h, 4 h, 4.5 h or 5 h.

In some embodiments, the weight ratio of the activation catalyst to the co-catalyst is about 1:0.1. In other embodiments, the weight ratio is about 1:0.05, 1:0.07, 1:0.15, 1:0.2, 1:0.25, 1:0.3, 1:0.35, 1:0.4, or 1:0.5.

In some embodiments, the pH of the mixture is maintained at about 7 to about 9.

In some embodiments, the mixture is heated at a temperature of about 150° C. to about 500° C. In other embodiments, the mixture is heated at a temperature of about 200° C. to about 500° C., about 250° C. to about 500° C., about 300° C. to about 500° C., about 350° C. to about 500° C., or about 400° C. to about 500° C.

In some embodiments, the mixture is heated to less than 490° C. In other embodiments, the mixture is heated to less than 480° C., 470° C., 460° C., 450° C., 440° C., 430° C., 420° C., 410° C., or 400° C. In other embodiments, the mixture is heated to about 490° C., 480° C., 470° C., 460° C., 450° C., 440° C., 430° C., 420° C., 410° C., 400° C., 350° C., 300° C., 250° C., or 200° C. In other embodiments, the mixture is heated from about 200° C. to about 500° C., about 250° C. to about 500° C., about 300° C. to about 500° C., about 350° C. to about 500° C., about 370° C. to about 500° C., about 400° C. to about 500° C., about 420° C. to about 500° C., about 440° C. to about 500° C., about 460° C. to about 500° C., or about 480° C. to about 500° C.

In some embodiments, the mixture is heated at a rate of about 1° C./min to about 5° C./min. In other embodiments, the mixture is heated at a rate of about 1° C./min to about 4° C./min, or about 2° C./min to about 4° C./min.

In some embodiments, the mixture is heated at about 400° C. for at least 3 h for forming the activated carbon. In other embodiments, the mixture is heated for at least 3 h, 3.5 h, 4 h, 4.5 h, 5 h, 5.5 h or 6 h.

Advantageously, this temperature is lower than that used in the prior art and hence can be more suitable for large scale manufacturing. Additionally, in combination with the activation catalyst, the activation catalyst can be activated to produce uniform pores and finally broken down for removal easily. This provides a product which is superior (or at least have the same performance) as commercially available activated carbon.

In some embodiments, the method further comprises a step after step (a) of drying the mixture. The step of drying the mixture is to remove the solvent, in preparation of it being subjected to the heating step. In this regard, the mixture is void of the solvent before the heating step. This is advantageous as a pressurised and/or closed system is not required in this method. Accordingly, the energy consumption and safety requirements in fabricating the activated carbon is lower than other commercial products. The drying can occur at about 100° C. In other embodiments, the drying is at about 80° C., about 90° C., about 100° C., about 110° C., about 120° C., about 130° C., or about 140° C. In other embodiments, the mixture is dried for about 1 h, about 2 h, about 3 h, about 4 h, about 5 h, about 6 h, about 7 h, about 8 h, about 10 h, about 12 h or about 24 h.

In some embodiments, the step of drying the mixture is performed by filtering the mixture through a filter and collecting the solid. In other embodiments, the mixture is dried by evaporating the solvent. For example, if water is used, the mixture can be dried at a temperature of more than about 100° C. for at least about 1 h.

In some embodiments, after heating the mixture to form the activated carbon, the activated carbon is subjected to a purification step. The purification step can comprise washing with water, filtrating and drying the activated carbon.

Accordingly, in some embodiments, the method of forming activated carbon comprises:

a) mixing carbon black with an activation catalyst in a polar solvent to form a mixture; and
b) drying the mixture in step (a) to form a solid;
c) heating the solid in step (b) at about 350° C. to about 500° C. in order to form the activated carbon;

wherein the weight ratio of carbon black to activation catalyst is of about 1:0.1 to about 1:0.5; and wherein the activation catalyst is selected from ammonium persulfate, sodium persulfate, potassium persulfate or a combination thereof.

In some embodiments, the method comprises:

a) mixing carbon black with an activation catalyst in a polar solvent to form a mixture; and
b) heating the mixture at about 400° C. for at least 3 h for forming the activated carbon;

wherein the weight ratio of carbon black to activation catalyst is about 1:0.2; and wherein the activation catalyst is selected from ammonium persulfate.

In some embodiments, the method comprises:

a) mixing carbon black with an activation catalyst in a polar solvent to form a mixture; and
b) drying the mixture in step (a) to form a solid;
c) heating the solid in step (b) at about 400° C. in order to form the activated carbon;

wherein the weight ratio of carbon black to activation catalyst is about 1:0.2; and wherein the activation catalyst is selected from ammonium persulfate.

In some embodiments, the method comprises:

a) mixing carbon black with an activation catalyst in a polar solvent to form a mixture; and
b) heating the mixture at about 400° C. for at least 3 h for forming the activated carbon;

wherein the weight ratio of carbon black to activation catalyst is about 1:0.2; and wherein the activation catalyst is selected from ammonium persulfate;

wherein the mixture further comprises ammonia as a co-catalyst;

wherein the weight ratio of the activation catalyst to the co-catalyst is about 1:0.1; and wherein a pH of the mixture is maintained at about 7 to about 9.

In some embodiments, the method comprises:

a) mixing carbon black with an activation catalyst in a polar solvent to form a mixture; and
b) drying the mixture in step (a) to form a solid;
c) heating the solid in step (b) at about 400° C. for at least 3 h for forming the activated carbon;

wherein the weight ratio of carbon black to activation catalyst is about 1:0.2; and wherein the activation catalyst is selected from ammonium persulfate;

wherein the mixture further comprises ammonia as a co-catalyst;

wherein the weight ratio of the activation catalyst to the co-catalyst is about 1:0.1; and wherein a pH of the mixture is maintained at about 7 to about 9.

The as formed activated carbon is nanoporous in nature. In particular, the activated carbon is both microporous and mesoporous. In this regard, the pores can have a size of about 0.2 to about 50 nm.

For example, Table 2 shows an example of the activated carbon with a pore diameter of 1.53 nm. In some embodiments, the activated carbon has a micropore ratio relative to the total porosity of about 40% to about 99%. In other embodiments, the micropore ratio is about 45% to about 99%, about 50% to about 99%, about 55% to about 99%, about 60% to about 99%, about 65% to about 99%, about 70% to about 99%, about 75% to about 99%, about 80% to about 99%, about 85% to about 99%, about 90% to about 99%, about 91% to about 99%, about 92% to about 99%, about 93% to about 99%, about 94% to about 99%, or about 95% to about 99%. In other embodiments, the micropore ratio is about 50% to about 99%, about 50% to about 85%, about 50% to about 80%, about 50% to about 75%, about 50% to about 70%, about 50% to about 65%, about 50% to about 60%, or about 50% to about 55%. The micropore ratio can for example be obtained by comparing the iodine number and the BET surface area of the activated carbon.

The method can further comprise a step of silane functionalising the carbon black for forming a silane functionalised activated carbon. Advantageously, the inventors have found that instead of introducing the silane functional groups directly on the activated carbon, by introducing the silane functional groups on the carbon black and subsequently subjecting the carbon black to the heating step, a better homogeneity and higher functionalisation rate can be obtained. Further, the heating program triggers pore formation, which increases the textural properties like surface area and pore radius.

Advantageously, the silane agent acts as a bridging moiety for the formation of mesoporous activated carbon. Towards this end, the silane agent allows for inter-carbon linkages between carbon particles to be formed, thus forming pores between the carbon particles.

Accordingly, in some embodiments, the method comprises:

ai) mixing carbon black with a silane agent;

a) mixing the mixture from step (ai) with an activation catalyst in a polar solvent to form a mixture; and b) heating the mixture at about 350° C. to about 500° C. for forming the activated carbon;

wherein the weight ratio of carbon black to activation catalyst is of about 1:0.1 to about 1:0.5;

wherein the activation catalyst is selected from ammonium persulfate, sodium persulfate, potassium persulfate, acetic acid, ammonia or a combination thereof.

In some embodiments, the silane agent is selected from bistriethoxysilane (1,2-bis(triethoxysilyl)ethane), 1,2-Bis(trichlorosilyl)ethane, 1,2-Bis(trimethoxysilyl)ethane or a combination thereof. In other embodiments, the silane agent is bistriethoxysilane (1,2-bis(triethoxysilyl)ethane).

In some embodiments, the weight ratio of carbon black to silane agent is about 1:0.25. In other embodiments, the weight ratio is about 1:0.15, 1:0.2, 1:0.3, 1:0.35 or 1:0.4. In some embodiments, the weight ratio of carbon black to silane agent is of about 1:0.18 to about 1:0.25. In other embodiments, the weight ratio is of about 1:0.19 to about 1:0.25, about 1:0.20 to about 1:0.25, about 1:0.21 to about 1:0.25, about 1:0.22 to about 1:0.25, or about 1:0.23 to about 1:0.25.

In some embodiments, with the addition of the silane agent, the mixture is stirred for at least 1 h. This allows the silane agent to react with the carbon black. In other embodiments, the mixture is stirred for at least 1.5 h, 2 h, 2.5 h, 3 h, 3.5 h, 4 h, 6 h, 8 h, 12 h, or 24 h.

In some embodiments, with the addition of the silane agent, the mixture is stirred at room temperature. In other embodiments, the mixture is stirred at about 15° C., 20° C., 25° C., 35° C., or 40° C.

In some embodiments, a silanisation catalyst is added with the silane agent. In some embodiments, the activation catalyst is acetic acid and/or ammonia. Other catalyst that is suitable for silanization can also be used. It was found that a milder catalyst is advantageous for facilitating the silane functionalisation.

In some embodiments, the weight ratio of silane agent to the catalyst is about 1:0.5. In other embodiments, the weight ratio is 1:0.3, 1:0.35, 1:0.4, 1:0.45, 1:0.6, 1:0.7, 1:0.8, 1:0.9, 1:1, 1:1.1, 1:1.2, 1:1.3, 1:1.4, 1:1.5, 1:1.6, or 1:1.7. In some embodiments, the weight ratio of silane agent to catalyst is of about 1:0.5 to about 1:1.7. In other embodiments, the weight ratio is of about 1:0.5 to about 1:1.6, about 1:0.5 to about 1:1.5, about 1:0.5 to about 1:1.4, about 1:0.5 to about 1:1.3, about 1:0.5 to about 1:1.2, about 1:0.5 to about 1:1.1, about 1:0.5 to about 1:1.0, about 1:0.5 to about 1:0.9, about 1:0.5 to about 1:0.8, about 1:0.5 to about 1:0.7, or about 1:0.5 to about 1:0.6.

To facilitate the dispersion of the silanized carbon black, a polar solvent system can be used. In some embodiments, the solvent is a mixture of water and ethanol at a weight ratio of 85:15, a mixture of water and ethylene glycol at a weight ratio of 85:15, or a mixture of ethanol and ethylene glycol at a weight ratio of 85:15. Other combinations of these solvents can also be used, which depends on the amount of silane agent added and/or the amount of carbon black.

In some embodiments, the mixture is heated at about 350° C. for at least 6 h for forming the silane functionalised activated carbon. In other embodiments, the mixture is heated at more than 350° C. In other embodiments, the mixture is heated at about 400° C. for at least 3 h.

In some embodiments, the method further comprises a step after step (ai) of drying the mixture. The step of drying the mixture is to remove the solvent, in preparation of it being subjected to mixing the silanized carbon black with the activation catalyst. This also allows for a change in the polar solvent. In this regard, the mixture is void of the solvent before the mixing step with the activation catalyst. The drying can occur at about 100° C. In other embodiments, the drying is at about 80° C., about 90° C., about 100° C., about 110° C., about 120° C., about 130° C., or about 140° C. In other embodiments, the mixture is dried for about 1 h, about 2 h, about 3 h, about 4 h, about 5 h, about 6 h, about 7 h, about 8 h, about 10 h, about 12 h or about 24 h.

In some embodiments, the step of drying the mixture is performed by filtering the mixture through a filter and collecting the solid. In other embodiments, the mixture is dried by evaporating the solvent. For example, if water and/or ethanol is used, the mixture can be dried at a temperature of more than about 100° C. for at least about 1 h.

The as formed silanized activated carbon is nanoporous in nature. In particular, the silanized activated carbon is both microporous and mesoporous. In this regard, the pores have a size of about 0.2 to about 50 nm.

In some embodiments, the method comprises:

ai) mixing carbon black with a silane agent;

a) mixing the mixture from step (ai) with an activation catalyst in a polar solvent to form a mixture; and b) heating the mixture at about 350° C. to about 500° C. for forming the activated carbon;

wherein the weight ratio of carbon black to activation catalyst is of about 1:0.1 to about 1:0.5;

wherein the activation catalyst is selected from ammonium persulfate, sodium persulfate, potassium persulfate, or a combination thereof.

In some embodiments, the method comprises:

ai) mixing carbon black with a silane agent and a catalyst;

a) mixing the mixture from step (ai) with an activation catalyst in a polar solvent to form a mixture; and b) heating the mixture at about 350° C. to about 500° C. for forming the activated carbon;

wherein the weight ratio of carbon black to activation catalyst is of about 1:0.1 to about 1:0.5;

wherein the catalyst is acetic acid and/or ammonia; and wherein the activation catalyst is selected from ammonium persulfate, sodium persulfate, potassium persulfate, or a combination thereof.

In some embodiments, the method comprises:

ai) mixing carbon black with a silane agent and a catalyst;

a) mixing the mixture from step (ai) with an activation catalyst in a polar solvent to form a mixture; and b) heating the mixture at about 350° C. to about 500° C. for forming the activated carbon;

wherein the weight ratio of carbon black to activation catalyst is of about 1:0.1 to about 1:0.5;

wherein the silane agent is selected from bistriethoxysilane (1,2-bis(triethoxysilyl)ethane), 1,2-Bis(trichlorosilyl)ethane, 1,2-Bis(trimethoxysilyl)ethane or a combination thereof;

wherein the catalyst is acetic acid and/or ammonia; and wherein the activation catalyst is selected from ammonium persulfate, sodium persulfate, potassium persulfate, or a combination thereof.

In some embodiments, the method comprises:

ai) mixing carbon black with a silane agent and a catalyst;

a) mixing the mixture from step (ai) with an activation catalyst in a polar solvent to form a mixture; and b) heating the mixture at about 350° C. to about 500° C. for forming the activated carbon;

wherein the weight ratio of carbon black to activation catalyst is of about 1:0.1 to about 1:0.5;

wherein the silane agent is selected from bistriethoxysilane (1,2-bis(triethoxysilyl)ethane), 1,2-Bis(trichlorosilyl)ethane, 1,2-Bis(trimethoxysilyl)ethane or a combination thereof;

wherein the catalyst is acetic acid and/or ammonia;

wherein the activation catalyst is selected from ammonium persulfate, sodium persulfate, potassium persulfate, or a combination thereof; and wherein the weight ratio of carbon black to silane agent is about 1:0.25.

In some embodiments, the method comprises:

ai) mixing carbon black with a silane agent and a catalyst;

aii) drying the mixture in step (ai) to form a solid;

a) mixing the solid from step (aii) with an activation catalyst in a polar solvent to form a mixture; and b) heating the mixture at about 350° C. to about 500° C. for forming the activated carbon;

wherein the weight ratio of carbon black to activation catalyst is of about 1:0.1 to about 1:0.5;

wherein the catalyst is acetic acid and/or ammonia; and wherein the activation catalyst is selected from ammonium persulfate, sodium persulfate, potassium persulfate, or a combination thereof.

In some embodiments, the method comprises:

ai) mixing carbon black with a silane agent and a catalyst;

aii) drying the mixture in step (ai) to form a first solid;

a) mixing the solid from step (aii) with an activation catalyst in a polar solvent to form a mixture;

b) drying the mixture in step (a) to form a second solid; and c) heating the second solid at about 350° C. to about 500° C. for forming the activated carbon;

wherein the weight ratio of carbon black to activation catalyst is of about 1:0.1 to about 1:0.5;

wherein the catalyst is acetic acid and/or ammonia; and wherein the activation catalyst is selected from ammonium persulfate, sodium persulfate, potassium persulfate, or a combination thereof.

In some embodiments, the method comprises:

ai) mixing carbon black with a silane agent and a catalyst;

aii) drying the mixture in step (ai) to form a first solid;

a) mixing the solid from step (aii) with an activation catalyst in a polar solvent to form a mixture;

b) drying the mixture in step (a) to form a second solid; and c) heating the second solid at about 350° C. to about 500° C. for forming the activated carbon;

wherein the weight ratio of carbon black to activation catalyst is of about 1:0.2;

wherein the catalyst is acetic acid and/or ammonia; and wherein the activation catalyst is ammonium persulfate.

The inventors have further found that activated carbon with a higher ratio of mesopores relative to micropores can be formed through the reaction with the silane agent. These mesoporous activated carbon has pores of about 2 to about 50 nm. This can be obtained by mixing carbon black, a silane agent and an activation catalyst together in a polar solvent and subsequently heating the mixture. The silane agent acts as a bridging moiety for the formation of mesoporous activated carbon. Towards this end, the silane agent allows for inter-carbon linkages between carbon particles to be formed, thus forming additional mesopores between the carbon particles. Advantageously, this increases the amount of mesopores (relative to the micropores) and hence the surface area.

In some embodiments, the carbon black, silane agent and activation catalyst is added in a single step.

Accordingly, the present invention also provides a method of forming silane functionalised activated carbon, comprising:

a) mixing carbon black with an activation catalyst in a polar solvent to form a mixture; and b) heating the mixture at about 350° C. to about 500° C. for forming the activated carbon;

wherein the weight ratio of carbon black to activation catalyst is of about 1:0.1 to about 1:0.5;

wherein the activation catalyst is selected from ammonium persulfate, sodium persulfate, potassium persulfate, acetic acid, ammonia or a combination thereof; and wherein mixing step (step (a)) further comprises a silane agent.

In some embodiments, the method comprises:

a) mixing carbon black with an activation catalyst in a polar solvent to form a mixture; and b) drying the mixture in step (a) to form a solid;

c) heating the solid at about 350° C. to about 500° C. for forming the activated carbon;

wherein the weight ratio of carbon black to activation catalyst is of about 1:0.1 to about 1:0.5;

wherein the activation catalyst is selected from ammonium persulfate, sodium persulfate, potassium persulfate, acetic acid, ammonia or a combination thereof; and wherein mixing step (step (a)) further comprises a silane agent.

In some embodiments, the method comprises:

a) mixing carbon black with an activation catalyst in a polar solvent to form a mixture; and b) heating the mixture at about 350° C. to about 500° C. for forming the activated carbon;

wherein the weight ratio of carbon black to activation catalyst is of about 1:0.1 to about 1:0.5;

wherein the activation catalyst is selected from ammonium persulfate, sodium persulfate, potassium persulfate, acetic acid, ammonia or a combination thereof;

wherein mixing step (step (a)) further comprises bistriethoxysilane as a silane agent; and wherein the weight ratio of carbon black to silane agent is about 1:0.25.

In some embodiments, the method comprises:

a) mixing carbon black with an activation catalyst in a polar solvent to form a mixture; and b) drying the mixture in step (a) to form a solid;

c) heating the solid at about 350° C. to about 500° C. for forming the activated carbon;

wherein the weight ratio of carbon black to activation catalyst is of about 1:0.1 to about 1:0.5;

wherein the activation catalyst is selected from ammonium persulfate, sodium persulfate, potassium persulfate, acetic acid, ammonia or a combination thereof;

wherein mixing step (step (a)) further comprises bistriethoxysilane as a silane agent; and wherein the weight ratio of carbon black to silane agent is about 1:0.25.

In some embodiments, the method comprises:

a) mixing carbon black with an activation catalyst in a polar solvent to form a mixture; and b) heating the mixture at about 400° C. for forming the activated carbon;

wherein the weight ratio of carbon black to activation catalyst is about 1:0.1;

wherein the activation catalyst is acetic acid and/or ammonia;

wherein mixing step (step (a)) further comprises bistriethoxysilane as a silane agent;

wherein the weight ratio of carbon black to silane agent is about 1:0.25; and wherein the weight ratio of silane agent to catalyst is about 1:0.5.

Advantageously, due to the increased amount of mesopores and hence the surface area, it was found that a chemical activation using persulfates (while is further advantageous) is not necessary for applications such as in oil waste adsorption.

For example, Table 2 shows an example of the silanised activated carbon with a pore diameter of 9.02 nm. In some embodiments, the silanised activated carbon has a micropore ratio relative to the total porosity of about 10% to about 50%. In other embodiments, the micropore ratio is about 15% to about 50%, about 20% to about 50%, about 15% to about 50%, about 25% to about 50%, about 30% to about 50%, about 35% to about 50%, about 40% to about 50%, or about 45% to about 50%. The micropore ratio can for example be obtained by comparing the iodine number and the BET surface area of the activated carbon.

In some embodiments, the method comprises:

a) mixing carbon black with an activation catalyst in a polar solvent to form a mixture; and b) drying the mixture in step (a) to form a solid;

c) heating the solid at about 400° C. for forming the activated carbon;

wherein the weight ratio of carbon black to activation catalyst is about 1:0.1;

wherein the activation catalyst is acetic acid and/or ammonia;

wherein mixing step (step (a)) further comprises bistriethoxysilane as a silane agent;

wherein the weight ratio of carbon black to silane agent is about 1:0.25; and wherein the weight ratio of silane agent to catalyst is about 1:0.5.

In some embodiments, the method of forming silane functionalised activated carbon, comprises:

a) mixing carbon black with a silane agent and an activation catalyst in a polar solvent to form a mixture; and b) heating the mixture at about 350° C. to about 500° C. for forming the silane functionalised activated carbon;

wherein the weight ratio of carbon black to activation catalyst is of about 1:0.1 to about 1:0.5;

and wherein the activation catalyst is selected from acetic acid or ammonia.

In some embodiments, the method of forming silane functionalised activated carbon, comprises:

a) mixing carbon black with a silane agent and an activation catalyst in a polar solvent to form a mixture; and b) drying the mixture in step (a) to form a solid;

c) heating the solid at about 350° C. to about 500° C. for forming the silane functionalised activated carbon;

wherein the weight ratio of carbon black to activation catalyst is of about 1:0.1 to about 1:0.5;

and wherein the activation catalyst is selected from acetic acid or ammonia.

In some embodiments, the method of forming silane functionalised activated carbon, comprises:

a) mixing carbon black with a silane agent and an activation catalyst in a polar solvent to form a mixture; and b) heating the mixture at about 400° C. for forming the silane functionalised activated carbon;

wherein the weight ratio of carbon black to activation catalyst is about 1:0.1; and wherein the activation catalyst is acetic acid.

In some embodiments, the method of forming silane functionalised activated carbon, comprises:

a) mixing carbon black with a silane agent and an activation catalyst in a polar solvent to form a mixture; and b) drying the mixture in step (a) to form a solid;

c) heating the solid at about 400° C. for forming the silane functionalised activated carbon;

wherein the weight ratio of carbon black to activation catalyst is about 1:0.1; and wherein the activation catalyst is acetic acid.

In some embodiments, the method of forming silane functionalised activated carbon, comprises:

a) mixing carbon black with a silane agent and an activation catalyst in a polar solvent to form a mixture; and b) heating the mixture at about 400° C. for forming the silane functionalised activated carbon;

wherein the weight ratio of carbon black to activation catalyst is about 1:0.1; wherein the activation catalyst is acetic acid;

wherein the silane agent is bistriethoxysilane; and wherein the weight ratio of carbon black to silane agent is about 1:0.25.

In some embodiments, the method of forming silane functionalised activated carbon, comprises:

a) mixing carbon black with a silane agent and an activation catalyst in a polar solvent to form a mixture; and b) drying the mixture in step (a) to form a solid;

c) heating the solid at about 400° C. for forming the silane functionalised activated carbon;

wherein the weight ratio of carbon black to activation catalyst is about 1:0.1; wherein the activation catalyst is acetic acid;

wherein the silane agent is bistriethoxysilane; and wherein the weight ratio of carbon black to silane agent is about 1:0.25.

In some embodiments, the method of forming silane functionalised activated carbon, comprises:

a) mixing carbon black with a silane agent and an activation catalyst in a polar solvent to form a mixture; and b) heating the mixture at about 400° C. for forming the silane functionalised activated carbon;

wherein the weight ratio of carbon black to activation catalyst is about 1:0.1; wherein the activation catalyst is acetic acid;

wherein the silane agent is bistriethoxysilane;

wherein the weight ratio of carbon black to silane agent is about 1:0.25; and wherein the weight ratio of silane agent to catalyst is about 1:0.5.

In some embodiments, the method of forming silane functionalised activated carbon, comprises:

a) mixing carbon black with a silane agent and an activation catalyst in a polar solvent to form a mixture; and b) drying the mixture in step (a) to form a solid;

c) heating the solid at about 400° C. for forming the silane functionalised activated carbon;

wherein the weight ratio of carbon black to activation catalyst is about 1:0.1; wherein the activation catalyst is acetic acid;

wherein the silane agent is bistriethoxysilane;

wherein the weight ratio of carbon black to silane agent is about 1:0.25; and wherein the weight ratio of silane agent to catalyst is about 1:0.5.

The present invention also relates to an activated carbon formed from a method as disclosed herein. The activated carbon can have the particle size is about 40 nm to about 80 nm.

In other embodiments, when both microporous and mesoporous activated carbon is formed, the pore size is about 0.2 nm to about 50 nm, about 0.5 nm to about 50 nm, about 1 nm to about 50 nm, about 1 nm to about 45 nm, about 1 nm to about 40 nm, about 1 nm to about 35 nm, or about 1 nm to about 30 nm. In other embodiments, when both microporous and mesoporous activated carbon is formed, the pore size is about 0.2 nm to about 40 nm, about 0.2 nm to about 30 nm, about 0.2 nm to about 20 nm, about 0.2 nm to about 10 nm, about 0.2 nm to about 8 nm, about 0.2 nm to about 6 nm, about 0.2 nm to about 5 nm, about 0.2 nm to about 4 nm, about 0.2 nm to about 3 nm, or about 0.2 nm to about 2 nm.

In other embodiments, when both microporous and mesoporous activated carbon (or silanised activated carbon) is formed, the pore size is about 2 nm to about 50 nm, about 5 nm to about 50 nm, about 10 nm to about 50 nm, about 15 nm to about 50 nm, about 20 nm to about 50 nm, about 25 nm to about 50 nm, about 30 nm to about 50 nm, about 35 nm to about 50 nm, or about 40 nm to about 50 nm. In other embodiments, when both microporous and mesoporous activated carbon is formed, the pore size is about 2 nm to about 40 nm, about 2 nm to about 30 nm, about 2 nm to about 20 nm, or about 2 nm to about 10 nm.

The present invention also provides an activated carbon as disclosed herein. The activated carbon can have a particle size is about 40 nm to about 80 nm. The activated carbon can have a BET surface area of more than 600 $m^2/g$.

In some embodiments, the activated carbon is silane functionalised. In other embodiments, the activated carbon is silane functionalised with triethyoxsilane.

The present invention also provides a silane functionalised activated carbon as disclosed herein. The silane functionalised activated carbon can have a particle size of about 40 nm to about 80 nm. The silane functionalised activated carbon can have a BET surface area of more than 600 $m^2/g$.

The present invention also provides a silane functionalised activated carbon as disclosed herein. In some embodiments, the activated carbon has a particle size of about 140 nm to about 500 nm. In some embodiments, the silane functionalised activated carbon has a BET surface area of more than 600 $m^2/g$.

In some embodiments, the silane functionalised activated carbon comprises at least 4 carbon particles.

In some embodiments, the silane functionalised activated carbon has a silica shell with a thickness of about 10 nm on at least a surface of the activated carbon. In other embodiments, the thickness is about 15 nm or 20 nm.

In some embodiments, the silane functionalised activated carbon has a pore diameter of at least 9 nm.

By performing adsorption studies for Rhodamine B, Arsenate and Selenate, the synthesized activated carbon (or silane functionalised activated carbon) demonstrated higher adsorption capacity as compared with low-grade carbon extracted from carbon black waste and commercial carbon.

In some embodiments, the activated carbon (or silane functionalised activated carbon) has a BET surface area of more than 600 $m^2/g$. In other embodiments, the BET surface area is more than 650 $m^2/g$, 700 $m^2/g$, 750 $m^2/g$, or 800 $m^2/g$. In other embodiments, the BET surface area is about 600 $m^2/g$, about 650 $m^2/g$, about 700 $m^2/g$, about 750 $m^2/g$, or about 800 $m^2/g$. In other embodiments, the BET surface area is about 600 $m^2/g$ to about 1500 $m^2/g$, about 600 $m^2/g$ to about 1400 $m^2/g$, about 600 $m^2/g$ to about 1300 $m^2/g$, about 600 $m^2/g$ to about 1200 $m^2/g$, about 600 $m^2/g$ to about 1100 $m^2/g$, about 600 $m^2/g$ to about 1000 $m^2/g$, about 600 $m^2/g$ to about 900 $m^2/g$, or about 600 $m^2/g$ to about 800 $m^2/g$.

In some embodiments, the activated carbon (or silane functionalised activated carbon) has a total pore volume of more than 0.8 $cm^3/g$. In other embodiments, the total pore volume is more than 0.85 $cm^3/g$, 0.9 $cm^3/g$, 1 $cm^3/g$, 1.1 $cm^3/g$, 1.2 $cm^3/g$, 1.25 $cm^3/g$, 1.3 $cm^3/g$, 1.35 $cm^3/g$, 1.4 $cm^3/g$, 1.45 $cm^3/g$, or 1.5 $cm^3/g$. In other embodiments, the total pore volume is about 0.85 $cm^3/g$, 0.9 $cm^3/g$, 1 $cm^3/g$, 1.1 $cm^3/g$, 1.2 $cm^3/g$, 1.25 $cm^3/g$, 1.3 $cm^3/g$, 1.35 $cm^3/g$, 1.4 $cm^3/g$, 1.45 $cm^3/g$, or 1.5 $cm^3/g$. In other embodiments, the total pore volume is about 0.8 $cm^3/g$ to about 1.5 $cm^3/g$, about 0.8 $cm^3/g$ to about 1.4 $cm^3/g$, about 0.8 $cm^3/g$ to about 1.3 $cm^3/g$, about 0.8 $cm^3/g$ to about 1.2 $cm^3/g$, or about 0.8 $cm^3/g$ to about 1.1 $cm^3/g$.

In some embodiments, the activated carbon (or silane functionalised activated carbon) has a pore diameter of more than 1.45 nm. In other embodiments, the pore diameter is more than 1.5 nm, 1.6 nm, 1.7 nm, 1.8 nm, 1.9 nm, 2 nm, 3 nm, 4 nm, 5 nm, 6 nm, 7 nm, 8 nm, or 9 nm. In other embodiments, the pore diameter is about 1.45 nm, 1.5 nm, 1.6 nm, 1.7 nm, 1.8 nm, 1.9 nm, 2 nm, 3 nm, 4 nm, 5 nm, 6 nm, 7 nm, 8 nm, or 9 nm. In some embodiments, the activated carbon (or silane functionalised activated carbon) has a pore diameter of at least 1.5 nm. In other embodiments, the pore diameter is at least 1.5 nm, 1.6 nm, 1.7 nm, 1.8 nm, 1.9 nm, 2 nm, 3 nm, 4 nm, 5 nm, 6 nm, 7 nm, 8 nm, or 9 nm. In other embodiments, the pore diameter is about 1.5 nm to about 10 nm, about 1.5 nm to about 9 nm, about 1.5 nm to about 8 nm, about 1.5 nm to about 7 nm, about 1.5 nm to about 6 nm, or about 1.5 nm to about 5 nm.

In some embodiments, the activated carbon (or silane functionalised activated carbon) has a dye adsorption of at least 170 mg/g.

In other embodiments, the activated carbon (or silane functionalised activated carbon) has a As(V) absorption capacity of at least 60 mg/g, 70 mg/g, 80 mg/g, 90 mg/g, 100 mg/g, 110 mg/g, or 120 mg/g. In other embodiments, the activated carbon (or silane functionalised activated carbon) has a As(V) absorption capacity of about 60 mg/g, 70 mg/g, 80 mg/g, 90 mg/g, 100 mg/g, 110 mg/g, or 120 mg/g.

In other embodiments, the activated carbon (or silane functionalised activated carbon) has a Se(VI) absorption capacity of at least 60 mg/g, 65 mg/g, 70 mg/g, 75 mg/g, 80 mg/g, 85 mg/g, 90 mg/g or 95 mg/g. In other embodiments, the activated carbon (or silane functionalised activated carbon) has a Se(VI) absorption capacity of more than 60 mg/g, 65 mg/g, 70 mg/g, 75 mg/g, 80 mg/g, 85 mg/g, 90 mg/g or 95 mg/g.

In other embodiments, the activated carbon (or silane functionalised activated carbon) has an iodine value of at least 500 mg/g, 550 mg/g, 600 mg/g, 650 mg/g, 700 mg/g, 750 mg/g, or 800 mg/g. In other embodiments, the activated carbon (or silane functionalised activated carbon) has an iodine value of more than 500 mg/g, 550 mg/g, 600 mg/g, 650 mg/g, 700 mg/g, 750 mg/g, or 800 mg/g.

In other embodiments, the activated carbon (or silane functionalised activated carbon) has a rhodamine B adsorption capacity of at least 170 mg/g, 175 mg/g, 180 mg/g, 190 mg/g, 200 mg/g, 210 mg/g, or 220 mg/g. In other embodiments, the activated carbon (or silane functionalised activated carbon) has a rhodamine B adsorption capacity of more than 170 mg/g, 175 mg/g, 180 mg/g, 190 mg/g, 200 mg/g, 210 mg/g, or 220 mg/g.

In other embodiments, the activated carbon (or silane functionalised activated carbon) has a methylene blue adsorption capacity of at least 100 mg/g, 105 mg/g, 110 mg/g, 120 mg/g, 130 mg/g, or 140 mg/g. In other embodiments, the activated carbon (or silane functionalised activated carbon) has a methylene blue adsorption capacity of more than 100 mg/g, 105 mg/g, 110 mg/g, 120 mg/g, 130 mg/g, or 140 mg/g.

In some embodiments, the activated carbon (or silane functionalised activated carbon) has a cell viability of more than 90% after a 24 h exposure and at a concentration of 200 μg/mL. In other embodiments, the activated carbon (or silane functionalised activated carbon) has a cell viability of more than 91%, 92%, 93%, 94%, or 95%. In this regard, the activated carbon is non-toxic to cells, organisms and the environment.

In some embodiments, the activated carbon (or silane functionalised activated carbon) has a HepG2 cell viability of more than 90% after a 24 h exposure and at a concentration of 200 μg/mL. In other embodiments, the activated carbon (or silane functionalised activated carbon) has a HepG2 cell viability of more than 91%, 92%, 93%, 94%, or 95%.

In some embodiments, the activated carbon (or silane functionalised activated carbon) has a MRCS cell viability of more than 90% after a 24 h exposure and at a concentration of 200 μg/mL. In other embodiments, the activated carbon (or silane functionalised activated carbon) has a MCR5 cell viability of more than 91%, 92%, 93%, 94%, or 95%.

In some embodiments, the activated carbon (or silane functionalised activated carbon) has a cell viability of more than 90% after a 48 h exposure and at a concentration of 200 μg/mL. In other embodiments, the activated carbon (or silane functionalised activated carbon) has a viability of more than 91%, 92%, 93%, 94%, or 95%. In this regard, the activated carbon is non-toxic to cells, organisms and the environment.

In some embodiments, the activated carbon (or silane functionalised activated carbon) has a HepG2 cell viability of more than 90% after a 48 h exposure and at a concentration of 200 μg/mL. In other embodiments, the activated carbon (or silane functionalised activated carbon) has a HepG2 cell viability of more than 91%, 92%, 93%, 94%, or 95%.

In some embodiments, the activated carbon (or silane functionalised activated carbon) has a MRCS cell viability of more than 90% after a 48 h exposure and at a concentration of 200 μg/mL. In other embodiments, the activated carbon (or silane functionalised activated carbon) has a MCR5 cell viability of more than 91%, 92%, 93%, 94%, or 95%.

In some embodiments, the activated carbon (or silane functionalised activated carbon) was synthesized from the recovered pure carbon black (Carbon X). SEM and TEM analyses were conducted to study the morphology of the activated carbon. The activated carbon was found to have spherical shape with particle size of 40-80 nm. Moreover, large surface area and increased pore volume of activated carbon (AC-AP) was found to be 671 $m^2/g$ and 1.54 $cm^3/g$, respectively. It was found to have a high adsorption capacity towards dye present in the aqueous solution, due to the porous nature of the activated carbon. This activated carbon can be used for other applications such as air purification, reinforcing agent for composite materials and pigments in paints. The obtained results demonstrate that the synthesized activated carbon can be considered as a low-cost, high-performance material for various industrial applications.

For example the AC-AP synthesized from carbon waste can be used for waste water treatment, adsorption of hazardous gas in the environment, reinforcing agent for composite materials and pigments in inks.

EXAMPLES

Materials

Carbon X was received from Sembcorp Industries Ltd., in Singapore Ammonium persulfate was used as a catalyst for activation, Ammonium hydroxide solution (28%), glacial acetic acid (99.7%), ethanol, ethylene glycol, Rhodamine B, Sodium arsenate heptahydrate and Sodium selenate were purchased from Sigma Aldrich. 1,2-Bis(triethoxysilyl)ethane, which is used as silane agent, was purchase from sigma Aldrich. All chemicals were used without further purification and water used in all the experiments were obtained from Milli Q water system.

Characterization Methods

Textural properties such as surface area, pore volume and pore diameter of the carbon nanoparticles were measured using Quantachrome Autosorb iQ C-XR. All samples were degassed at 200° C. for 6 h before the $N_2$ sorption analysis. Functional groups of the carbon samples were analyzed by Fourier Transform InfraRed spectra were measured between 4000 and 400 cm-1 on a Bruker Vertex 70 spectrometer with a Platinum attenuated total reflection (ATR) module. Carbon skeleton was recorded by Raman spectra from 1000 to 1800 $cm^{-1}$ on a Bruker RAMII spectrometer. The X-ray diffraction (XRD) patterns were characterized on a Bruker D8 Advance powder X-ray diffractometer. The morphology of the carbon material was examined by scanning electron microscope (FESEM) (JEOL, JSM-7610F) at an accelerating voltage of 20 kV, and high resolution transmission electron microscope (FETEM) (JEM-2100F) at an accelerating voltage of 200 kV. An elemental analyzer (EA, ThermoFisher Scientific FlashSmart CHNS Elemental Analyser) was used to investigate the composition of the samples. Thermal stability of the materials was carried out from 30 to 900° C. at a heating rate of 10° C. $min^{-1}$ under nitrogen atmosphere on a Perkin Elmer SII (Diamond series).

Adsorption Studies

For the adsorption studies, 10 mg of carbon samples was added to 20 ml of Rhodamine B (200 ppm), As(V) (200 ppm) and Se(VI) (200 ppm) solutions in a 50 ml polypropylene tube. The adsorption experiments were carried out in a mechanical shaker for 6 h at 250 rpm. After adsorption the carbon particles separated by centrifugation and dye solution concentration were analyzed by UV-Vis sphectrophotometer. The concentration of As(V) and Se(VI) was analyzed by ICP-OES. Iodine number and Methylene blue value was obtained by using ASTM-D4607 and Method JISK 1474 respectively.

Synthesis of Ammonium Persulfate Activated Carbon (AC-AP)

Briefly, a round bottom flask containing 50 ml of water (pH 7-9 using ammonia) and 10 g carbon X was stirred vigorously for 1 h at room temperature. Then 2 g of ammonium persulfate (AP) was added to the mixture and further stirred for 1 h. The obtained mixture was heated at 400° C. for 3-6 h to get the porous activated carbon (AC-AP). An exemplary step-wise synthesis procedure of activated carbon is depicted in Scheme 1.

Scheme 1. Schematic digram for the synthesis of Activated carbon (AC-AP)

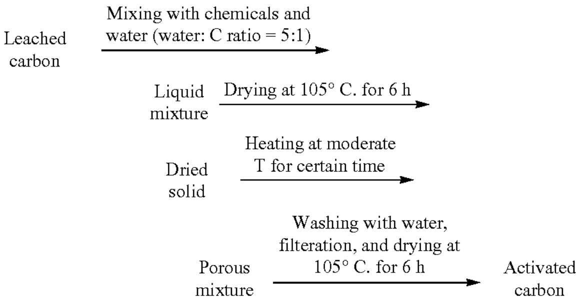

The method was also applied to other carbon black materials such as for the conversion of oil refinery carbon waste to activated carbon.

Synthesis of Silane Functionalized Activated Carbon (AC—Si)

Silane functionalized activated carbon was synthesized by surface functionalization of carbon X using bistriethoxysilane. Carbon X nanoparticles (10 g) were dispersed in a mixture of water (85 ml) and ethanol (15 ml). Then carbon X were anchored with silica by adding 2.6 ml bistriethoxysilane and 1.2 ml acetic acid to the above dispersion, and sonicated for 10 mins. The mixture was stirred for 3 h at room temperature and then centrifuged to get the silane functionalized carbon X. The obtained silane functionalized carbon X mixture was heated at 400° C. for 3-6 h to get the silane functionalized activated carbon (Carbon black-Si). An exemplary step-wise synthesis procedure of silane functionalized activated carbon is depicted in Scheme 2.

Scheme 2. Schematic diagram for the synthesis of Silane functionalized carbon (AC-Si)

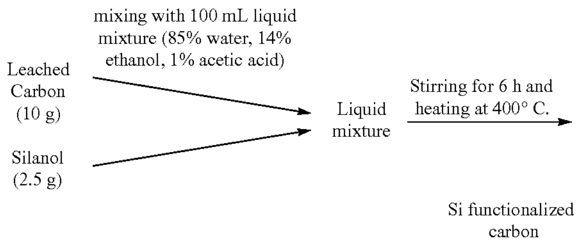

Example 1

SEM images of Carbon X, AC-AP, AC-Si are shown in FIG. 1. Carbon X and CA-AP images showed particles of uniform size with sphere like morphology, as shown in FIG. 1*a&b*. The particles are interconnected by weak force and this interlinked particle network observed in all the samples. It is observed that lots of voids presented in between the carbon particles due to the interlinking network structure. The morphology of the AC-AP is not affected by the ammonium persulfate oxidation. The AC-Si showed dense dark particles (silica) in between the spherical carbon nanoparticles, which proves the functionalization of silane on the carbon X, as shown in FIG. 1*e*.

Example 2

Figure 2:
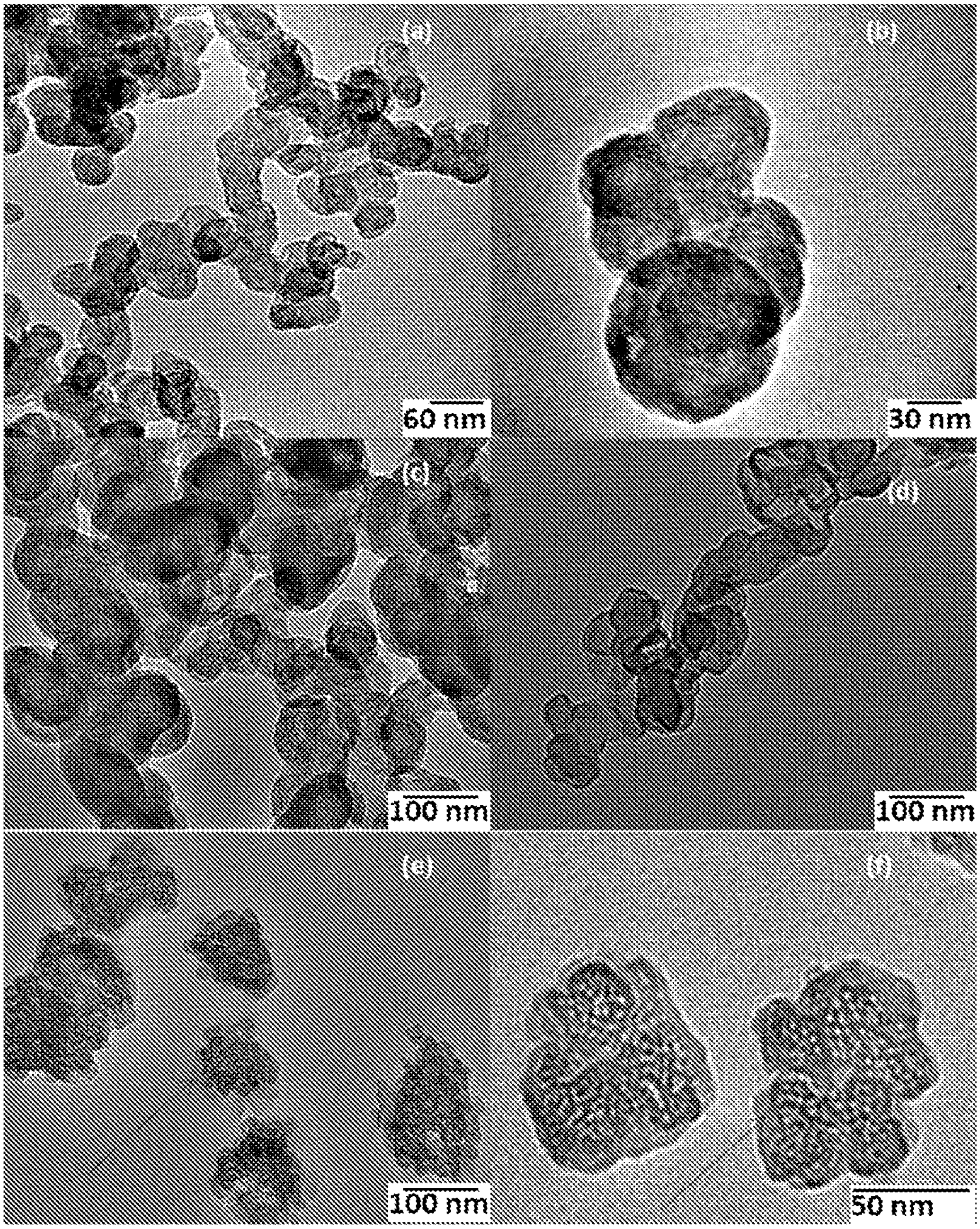
FIG. 2 illustrates TEM images of (a) Carbon X, (b) AC-AP and (c) AC-Si.

The particle size and morphology of the carbon nanoparticles were examined using HR-TEM. The particle size of carbon X and AC-AP was in the range of 40-80 nm, as shown in FIG. 2*a&b*. The interlinking of carbon nanoparticles was clearly observed in FIG. 2*d*. In FIG. 2*c*, the aggregation and stacking of carbon nanoparticles forming a porous structure in interlinking network. AC-Si shows the core shell nanoparticle structure in FIG. 2*e*. The transparent silica shell was formed over the carbon nanoparticles was clearly observed in FIG. 2*f*. Silica shell was in the range of 10 nm thickness and core contains minimum 4-5 carbon nanoparticles. The functionalization of silane over carbon was in agreement with SEM results.

Example 3

Figure 3:
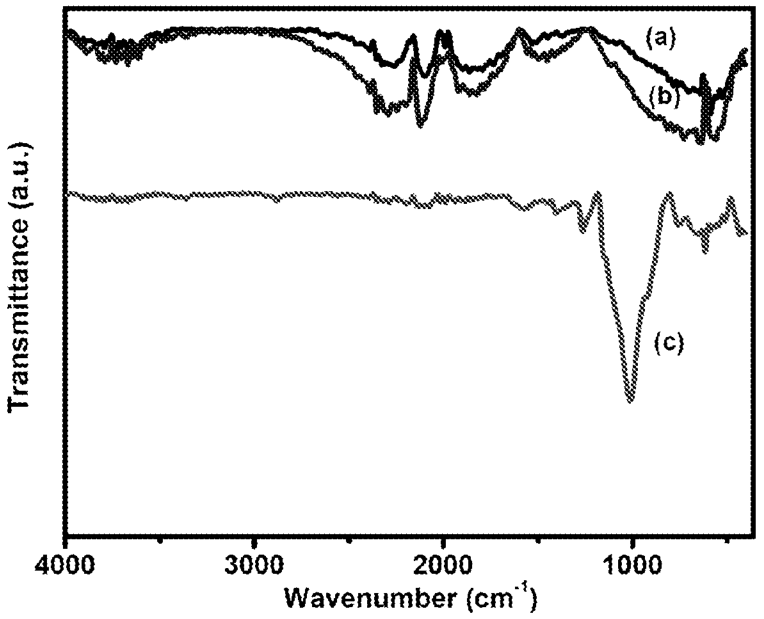
FIG. 3 illustrates FT-IR spectra of (a) Carbon X, (b) AC-AP and (c) AC-Si.

Fourier-transform infrared spectroscopy measurements were analyzed to identify the functional groups present in carbon X, AC-AP and AP-Si, as shown in FIG. 3. The spectra of all the three carbon materials differed significantly in the region 1600-900 $cm^{-1}$ due to the chemical treatment and functionalization of carbon. The absorption peak around 1550 and 1760 $cm^{-1}$ was assigned to C—C and C═O stretching vibration, respectively. In Carbon X, stronger peak appears at 1550 $cm^{-1}$ (C—C) compared to 1760 $cm^{-1}$ (C═O) peak, as shown in FIG. 3*a*. But for AC-AP, the peak at 1760 $cm^{-1}$ (C═O) is more intense compared to carbon X because a greater number of functional groups was created during the oxidation step, as shown in FIG. 3*b*. The AC-Si shows all the peaks similar to AC-AP and an additional peak observed at 1030 $cm^{-1}$ for Si—O stretching vibrations, which proved the functionalization of silane group over the carbon nanoparticles, as shown in FIG. 3*c*.

Example 4

Figure 4:
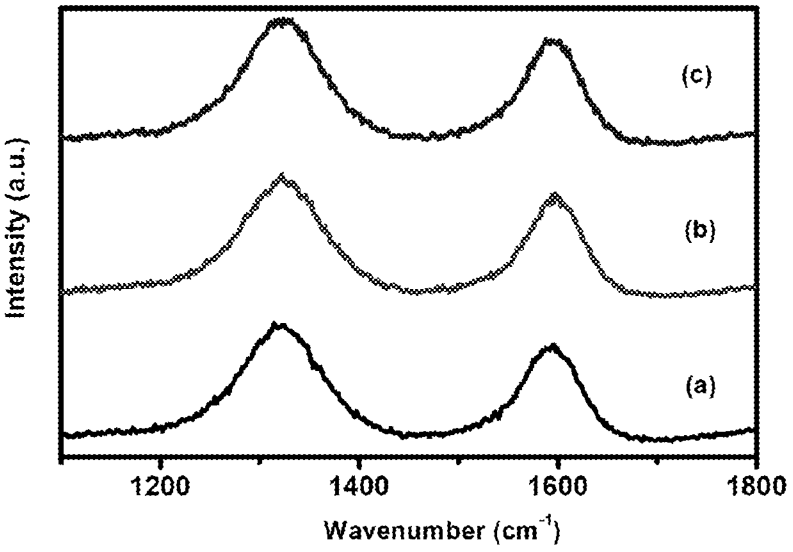
FIG. 4 illustrates Raman spectra of (a) Carbon X, (b) AC-AP and (c) AC-Si.

Raman spectroscopy was used to analyze the sp2 and sp3 carbon atoms presented in the carbon nanoparticles. In all the samples, the peaks were observed at 1330 and 1590 $cm^{-1}$, which correspond to D and G band, indicating the graphitic carbon skeleton, as shown in FIG. 4(*a-c*).

D band represents the disorder structure of sp2 carbon atom and G band represents the in plane vibration of sp2 carbon. The D and G band are broad for all the samples, which indicates the amorphous nature of the carbon nanoparticles, as shown in FIG. 4*a-c*. The graphitic structure of the carbon X was not destroyed by the activation treatments, as shown in FIG. 4*b&c*. The graphitic structure plays a vital role in the enhancement of textural properties such as increasing surface area and pore volume.

Example 5

Figure 5:
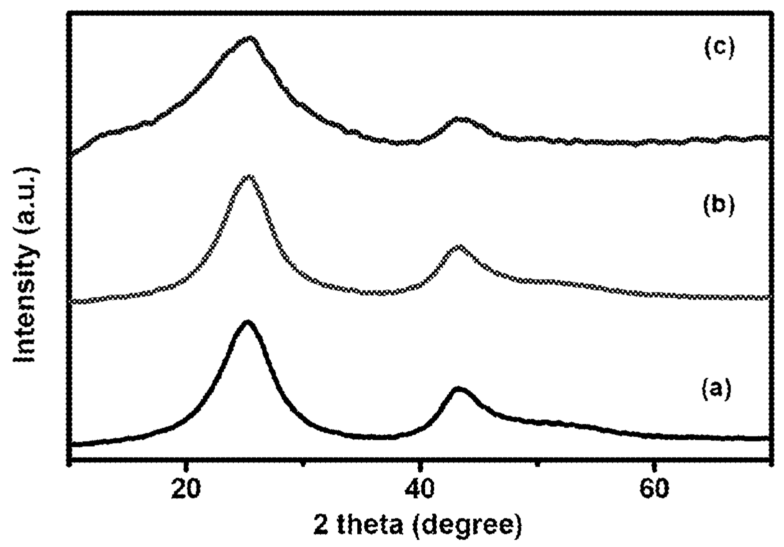
FIG. 5 illustrates XRD (a) Carbon X, (b) AC-AP and (c) AC-Si.

XRD patterns of carbon X, AC-AP and AC-Si are depicted in FIG. 5. The broad intense peak at 25° (2Θ) was the characteristic peak for the graphitic structure and the reflections observed at 43° (2Θ) is due to the diamond (111) plane, as shown in FIG. 5*a-c*. The AC-AP and AC-Si retained high graphitic structure even after the chemical and physical treatment. The peak at 25° (2Θ) in FIG. 5*b&c* shows that AC-AP and AC-Si contain high percentage of graphitic structure, which is in line with Raman results.

Example 6

Figure 6:
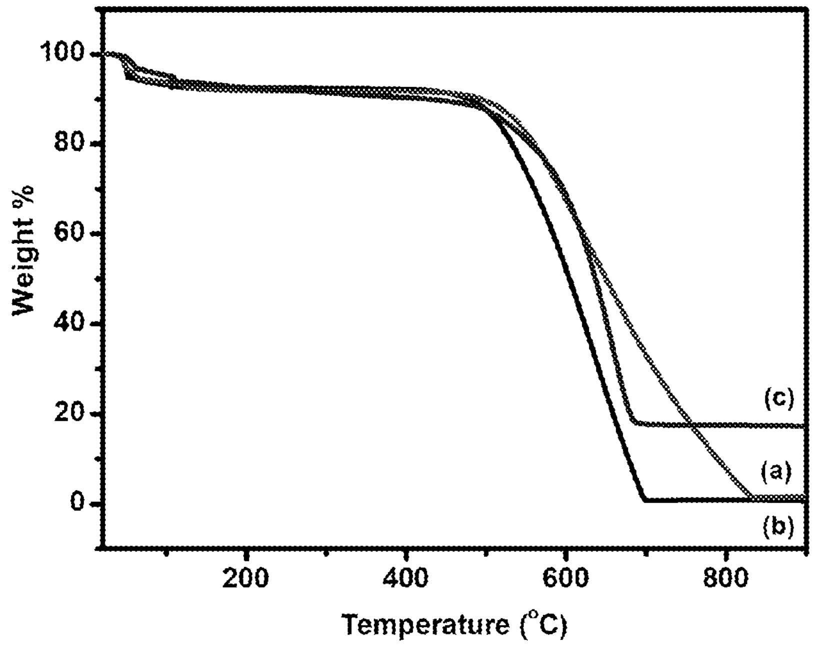
FIG. 6 illustrates TGA curves of (a) Carbon X, (b) AC-AP and (c) AC-Si.

Thermal stability of carbon nanoparticles was analyzed by TGA. The initial weight loss for the carbon nanoparticles was due to the moisture content. Carbon X starts to decompose at 520° C. and completely decompose around 850° C., as shown in FIG. 6*a*. The decomposition of AC-AP starts at 480° C., which shows weaker stability as compared to carbon X due to the functional groups presented in the AC-AP, as shown in FIG. 6*b*. The functional groups (C═O, C—O) have generated after the chemical and heat treatments and these functional groups could lower the thermal stability of carbon particles. AC-Si shows a similar trend with respect to AC-AP. FIG. 6*c* shows the residual mass fraction of carbon black Si was high due to the presence of silica. Elemental analysis of the carbon samples was performed by CHNS analyzer, as shown in Table 1. The carbon percentage in the samples was reduced after the activation process. This is in agreement with TGA results.

TABLE 1

Elemental analysis of the carbon nanoparticles.

| Samples | C | H | N | S |
|---|---|---|---|---|
| | (Weight %) | | | |
| Untreated carbon black waste | 87.98 | 0.50 | 0.50 | 1.41 |
| Carbon X | 84.76 | 0.91 | 0.83 | 0.72 |
| Activated Carbon | 75.82 | 1.04 | 0.51 | 0.50 |
| Silane functionalized carbon | 44.36 | 1.50 | — | 0.50 |

Example 7

Figure 7:
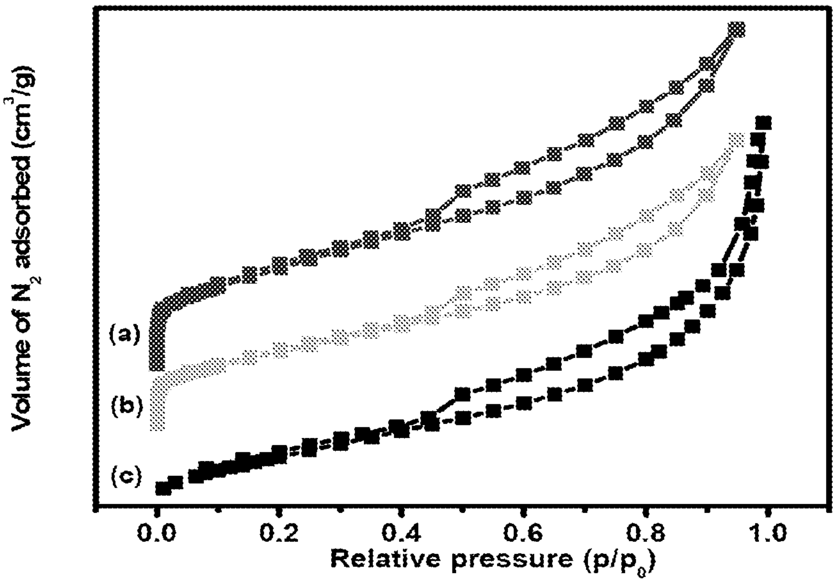
FIG. 7 illustrates $N_2$ sorption isotherms of (a) Carbon X, (b) AC-AP and (c) AC-Si.
Figure 8:
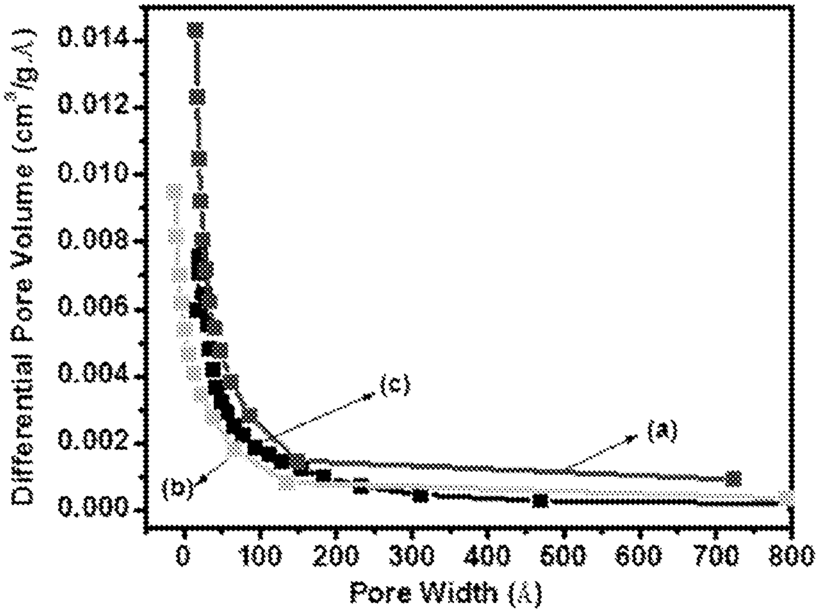
FIG. 8 illustrates pore size distribution curve of (a) Carbon X, (b) AC-AP and (c) AC-Si.

Textural parameters of carbon nanoparticle were examined by surface area analyzer. Carbon X and AC-AP shows type II isotherm with H4-hysteresis loops which indicates microporous in nature (FIG. 7(*a* & b). AC-Si exhibit type II isotherm with H3-hysteresis loops which shows both microporous and mesoporous exist in the carbon structure (FIG. 7*c*). The BET surface is (Multipoint Bet), pore volume (BJH method) and pore diameter (BJH method) of the carbon nanoparticles are listed in Table 2. The BET surface area of AC-AP was higher than carbon X due to the formation of pores by synergetic effect of ammonium persulfate and heating in the presence of air further increases the pore volume and pore diameter. Functionalization with silane agent decrease the surface area due to the blocking of micropores. Crosslinking between the carbon nanoparticles and silane agent could induce the mesopores, which increases the pore diameter of AC-Si. The pore size distribution of the carbon nanoparticles are shown in FIG. 8. Carbon X and AC-AP contain mostly micropores and AC-Si contains both micro and mesopores. The results of $N_2$ isotherm it clearly shows that the method developed in this study enhances the textural properties of the carbon nanoparticles.

TABLE 2

Textural parameters of (a) Carbon X, (b) AC—AP and (c) AC—Si.

| Samples | Specific Surface area ($m^2/g$) | Total pore volume ($cm^3/g$) | Pore Diameter (nm) |
|---|---|---|---|
| Carbon X | 410.32 | 1.14 | 1.43 |
| Activated Carbon | 820.19 | 1.54 | 1.53 |
| Silane functionalized carbon | 608.56 | 0.89 | 9.02 |

Example 8

Figure 9:
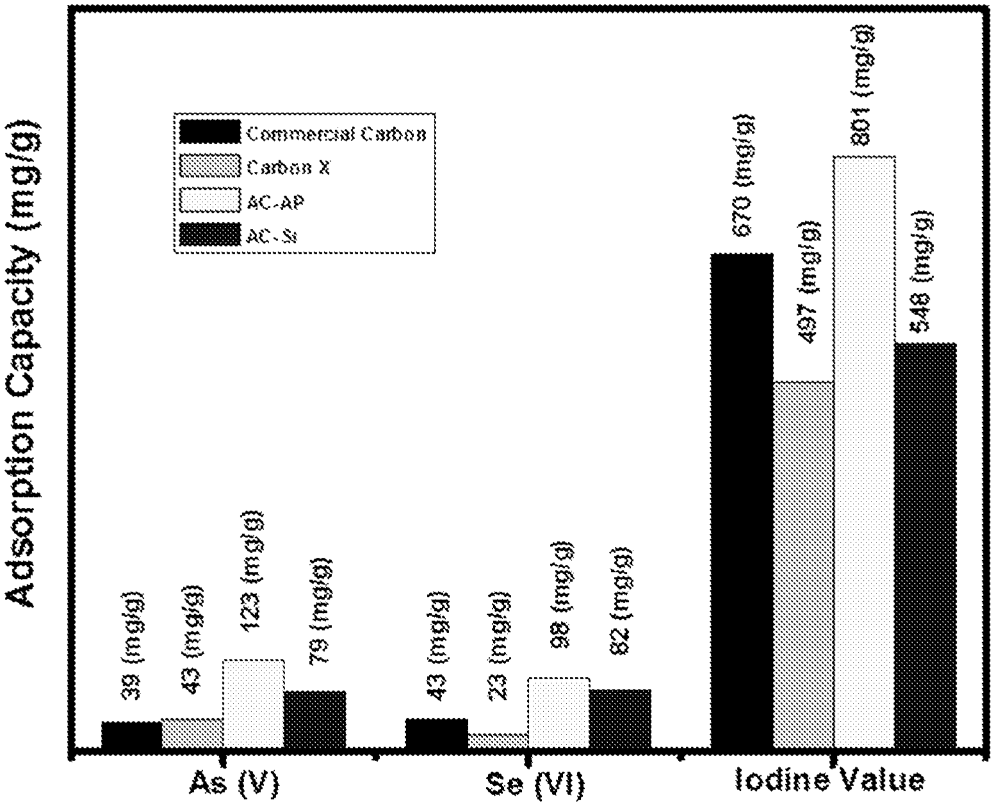
FIG. 9 illustrates adsorption capacity of commercial carbon, Carbon X, AC-AP and AC-Si.

Adsorption capacity of As(VI), Se(VI) and Iodine is shown in FIG. 9. As(V) and Se(VI) both existed in anionic form at neutral pH. Both As(V) and Se(VI) has strong interaction with functional groups present in the AC-AP. The AC-AP contains high amount of functional groups such as —COOH and —OH, which interact with the heavy metal anions in the solution. The negative charge of the anion (As(V) and Se(VI)) has the strong interaction with the positive charge of the —C═O present in the carboxylic acid groups in AC-AP. The hydrogen bond between the —OH group in AC-AP and O=Metal present in the metal anions have the interaction to hold the metal ions in the AC-AP. These interactions forms a chelating effect to capture the metal ions in the AC-AP. Another important parameter is the microporous nature of the AC-AP, the functional groups present in the micropores are close to each other which can bind the metal ions more efficiently by strong chelation effect. In the mesopores, the adsorption capacity for specific heavy metals decrease due the increase in the distance between the functional groups. The Carbon X has less functional groups and shows lower adsorption capacity compared to AC-AP. Compared to Carbon X, AC-Si shows better performance for heavy metal and iodine adsorption but lesser than AC-AP. The high amount of micropores leads to high Iodine number.

Example 9

The adsorption capacities for Rhodamine B and Methylene blue are listed in Table 3. AC-AP showed high adsorption capacity for dyes as compared to the other carbon nanoparticles, due to the high surface area and pore volume created during the chemical and thermal treatments. After the treatment, the AC-AP creates large number of micropores and mesopores. Because of the mesopores the adsorption of dyes increases compared to carbon X. Mesopores play a major role for the adsorption of dyes because dyes are bulky molecule. AC-Si also shows better performance than Carbon X. Activated carbon from a commercial source (Continental Carbon) is shown in Table 3 as a comparator.

TABLE 3

Adsorption capacities of carbon nanoparticles

| | Commercial carbon | Carbon X | AC—AP | AC—Si |
|---|---|---|---|---|
| Yield (%) | | | 85 | 95 |
| Adsorption of dye (mg/g) | 101 | 166 | 221 | 178 |
| Adsorption of Methylene Blue (mg/g) | 114 | 98 | 144 | 109 |
| BET surface area ($m^2/g$) | 600 | 410 | 820 | 608 |

Example 10

FIGS. 10*a* and *b*. shows that based on a dose and time-dependent manner the viability of HepG2, and MRC-5 were affected by the unleached carbon black waste. Overall, cell viability decreased with the increasing concentration of unleached carbon black waste. At greater concentrations 10 mg/mL, the viability of two cell lines was only 10% or less. For 24 h, more than 60% of HepG2 viability increased at low concentration of unleached carbon black waste (0.25 mg/mL), but the MRC-5 cell viability remained at less than 10% for all concentrations tested. This result may indicate that MRC-5 is a cell model that is very sensitive to the toxicity of carbon black waste extract. Taking this data into consideration, it clearly proposes that the fine and dusty carbon black waste when inhaled can cause serious damage to human lungs. The dose-dependence of viability became less obvious after 48 h exposure time. Very few cells remained viable after 48 h incubation with unleached carbon black waste extract of concentrations ≥5 mg/mL. In general, for a given extract concentration, viability was lower after 48 h than after 24 h. Therefore, the result obtained from the MTS toxicity experiment suggesting that longer exposure duration causes increased cytotoxicity.

FIG. 10 illustrates the viability of human cell lines. ((a) HepG2 cells incubated with unleached carbon black, (b) MRC-5 cells incubated with unleached carbon black (c) HepG2 cells incubated with AC-AP (d) MRC 5 cells incubated with AC-AP (e) HepG2 cells incubated with AC-Si (f) MRC 5 cells incubated with AC-Si Samples are incubated at different concentrations for a period of 24 h, and 48 h exposure. The data represent the mean±SD from three replicates for each run.

Considering the environmental safety in mind, the as-obtained carbon black waste extract was leached and activated with ammonium persulfate (AC-AP) and silane functionalized carbon (AP-Si). The toxicity of AC-AP and AC-Si was tested in liver carcinoma HepG2 cell line, and normal lung MRC-5 cell line. FIGS. 10*c, d, e* and *f* shows that at wide concentration range tested, AC-AP and AC-Si showed a fewer toxic effect on HEPG2 and MRC-5 cells after incubation for 24 h and 48 h. Hence this result indicating that AC-AP and AC-Si is safer and biocompatible to use for various environmental applications.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of forming activated carbon, comprising:
- a) mixing carbon black with an activation catalyst in a polar solvent to form a mixture; and
- b) heating the mixture at about 350° C. to about 500° C. in order to form the activated carbon;

wherein the weight ratio of carbon black to activation catalyst is of about 1:0.1 to about 1:0.5;

wherein the activation catalyst is selected from ammonium persulfate, sodium persulfate, potassium persulfate or a combination thereof, wherein the method further comprises adding a co-catalyst to the mixture of step a); and wherein the co-catalyst is ammonia or ammonium hydroxide.

2. The method according to claim 1, wherein the mixture is heated at about 400° C. for at least 3 h.

3. The method according to claim 1, wherein the solvent is selected from water, ethanol, ethylene glycol, a mixture of water and ethanol at a weight ratio of 85:15, a mixture of water and ethylene glycol at a weight ratio of 85:15, or a mixture of ethanol and ethylene glycol at a weight ratio of 85:15.

4. The method according to claim 1, wherein the weight ratio of carbon black to solvent is about 1:5 to about 1:100.

5. The method according to-claim 1, wherein the mixture is mixed for at least 1 h.

6. The method according to claim 1, wherein the co-catalyst is mixed with the mixture for at least 3 h.

7. The method according to claim 1, wherein the weight ratio of the activation catalyst to the co-catalyst is about 1:0.1.

8. The method according to claim 1, wherein the pH of the mixture is maintained at about 7 to about 9.

9. The method according to claim 1, wherein the mixture is heated at a rate of about 1° C./min to about 5° C./min.

10. The method according to claim 1, further comprising a step after step (a) of drying the mixture.

11. A method of forming silane functionalised activated carbon, comprising:

a) mixing carbon black with a silane agent and an activation catalyst in a polar solvent to form a mixture; and b) heating the mixture at about 350° C. to about 500° C. in order to form the silane functionalised activated carbon;

wherein the weight ratio of carbon black to activation catalyst is of about 1:0.1 to about 1:0.5; and wherein the activation catalyst is selected from acetic acid and/or ammonia.

12. The method according to claim 11, wherein the mixture is stirred for at least 3 h at room temperature.

13. The method according to claim 11, wherein the mixture is heated at about 350° C. for at least 6 h.

14. The method according to claim 11, wherein the weight ratio of carbon black to silane agent is of about 1:0.18 to about 1:0.25.

15. The method according to claim 11, wherein the weight ratio of silane agent to catalyst is of about 1:0.5 to about 1:1.7.

16. The method according to claim 11, wherein the silane agent is selected from bistriethoxysilane (1,2-bis(triethoxysilyl) ethane), 1,2-Bis(trichlorosilyl) ethane, 1,2-Bis (trimethoxysilyl) ethane or a combination thereof.

17. The silane functionalised activated carbon formed from the method according to claim 11, comprising at least 4 carbon particles.

* * * * *